United States Patent
Asterjadhi et al.

(10) Patent No.: US 12,507,296 B2
(45) Date of Patent: Dec. 23, 2025

(54) CROSS-LINK SIGNALING FOR MULTI-LINK DEVICES

(71) Applicant: QUALCOMM Incorporated, San Diego, CA (US)

(72) Inventors: Alfred Asterjadhi, San Diego, CA (US); Abhishek Pramod Patil, San Diego, CA (US); George Cherian, San Diego, CA (US); Yanjun Sun, San Diego, CA (US); Abdel Karim Ajami, Lakeside, CA (US); Sai Yiu Duncan Ho, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 695 days.

(21) Appl. No.: 17/821,452

(22) Filed: Aug. 22, 2022

(65) Prior Publication Data
US 2024/0064832 A1 Feb. 22, 2024

(51) Int. Cl.
*H04W 4/00* (2018.01)
*H04W 52/02* (2009.01)
(Continued)

(52) U.S. Cl.
CPC ....... *H04W 76/15* (2018.02); *H04W 52/0235* (2013.01); *H04W 74/0816* (2013.01)

(58) Field of Classification Search
CPC .. H04W 76/15; H04W 52/02; H04W 52/0235
See application file for complete search history.

(56) References Cited

U.S. PATENT DOCUMENTS 12,213,172 B2 * 1/2025 Kim ............. H04W 72/12
2021/0100053 A1  4/2021 Park et al.
(Continued)

FOREIGN PATENT DOCUMENTS

WO  2022125421 A1  6/2022
WO  2022173177 A1  8/2022

OTHER PUBLICATIONS

International Search Report and Written Opinion—PCT/US2023/070667—ISA/EPO—Nov. 9, 2023.
(Continued)

*Primary Examiner* — Elisabeth Benoit Magloire
(74) *Attorney, Agent, or Firm* — Kevin M. Donnelly; ArentFox Schiff LLP

(57) ABSTRACT

This disclosure provides methods, devices, and systems for communicating cross-link multi-link signaling (MLS) control signaling in wireless local area networks (WLANs). In various aspects, an apparatus may generate a frame that includes a header including an MLS subfield that includes a set of bits associated with a respective link of a set of links between the first MLD and a second MLD. The apparatus may configure a signaling type (s-type) of the MLS subfield with a value indicating a type of MLS control signaling associated with the MLS subfield, and may configure each bit of a first subset of bits of the MLS subfield with a value indicating that the type of MLS control signaling is applicable to the respective link associated with the bit. Further, the apparatus may output the first frame for transmission to the second MLD on a first link of the set of links.

29 Claims, 16 Drawing Sheets

(51) Int. Cl.
*H04W 74/0816* (2024.01)
*H04W 76/15* (2018.01)

(56) References Cited

U.S. PATENT DOCUMENTS

| | | | | |
|---|---|---|---|---|
| 2022/0201756 | A1* | 6/2022 | Xin | H04W 74/0816 |
| 2022/0418022 | A1* | 12/2022 | Kneckt | H04W 36/06 |
| 2023/0049552 | A1* | 2/2023 | Chitrakar | H04W 76/18 |
| 2023/0164859 | A1* | 5/2023 | Jang | H04W 76/11 |
| | | | | 370/328 |
| 2024/0064829 | A1* | 2/2024 | Jang | H04W 76/15 |
| 2024/0129271 | A1* | 4/2024 | Chitrakar | H04L 61/103 |
| 2024/0214920 | A1* | 6/2024 | Sevin | H04W 84/12 |
| 2024/0244481 | A1* | 7/2024 | Viger | H04W 28/0278 |
| 2024/0372645 | A1* | 11/2024 | Chun | H04W 72/04 |
| 2025/0080628 | A1* | 3/2025 | Kim | H04W 76/30 |

OTHER PUBLICATIONS

Ratnam V.V (Samsung)., et al., "ML Traffic Indication using A-control", IEEE Draft, 11-22-1201-00-00BE-Traffic-Indication-Using-A-Control, IEEE-SA Mentor, Piscataway, NJ USA, vol. 802 . 11 EHT, 802.11be, Jul. 26, 2022, 9 Pages, XP068193088, p. 5.

* cited by examiner

CROSS-LINK SIGNALING FOR MULTI-LINK DEVICES

TECHNICAL FIELD

This disclosure relates generally to wireless communication, and more specifically, to cross-link signaling for multi-link devices in wireless networks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Established and widely adopted WLAN communication protocols are designed for wireless communications between two devices on a single link. However, multi-link operation is being developed for the IEEE 802.11 standards. Specifically, multi-link operation may be featured in IEEE 802.11be in relation to Extremely High Throughput (EHT). With single-link operation, a WLAN node may include an STA or an AP having one radio interface with which to communicate data of one traffic flow. With multi-link operation, a WLAN node may include multiple radio interfaces over which to concurrently transmit and/or receive data of one traffic flow. Each of the multiple radio interfaces may operate in an individual frequency band, such as one of the carrier frequencies below seven (7) gigahertz (GHz), which may include the 2.4 GHz band, the 5 GHz band, or the 6 GHz bands.

New WLAN communication protocols are being developed to enable enhanced WLAN communication features (such as higher throughput and wider bandwidth) in even higher carrier frequencies, such as in the 45 GHz or 60 GHz frequency bands, which may further increase the functionality and versatility of multi-link operation to an even greater degree. However, multi-link operation may add to the overhead and complexity commensurate with WLAN signaling. Thus, as multi-link operation becomes more widely adopted, some enhancements to the signaling between WLAN devices may be beneficial to enable and support traffic on multiple different links.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a first multi-link device (MLD), and may include generating a frame that includes a header including a first field that includes a multi-link signaling (MLS) subfield, the MLS subfield including a set of bits, each bit of the set of bits being associated with a respective link of a set of links between the first MLD and a second MLD; configuring a signaling type (s-type) of the MLS subfield with a value indicating a type of MLS control signaling associated with the MLS subfield; configuring each bit of a first subset of bits of the set of bits of the MLS subfield with a value indicating that the type of MLS control signaling is applicable to the respective link associated with the bit; and transmitting the first frame to the second MLD on a first link of the set of links.

Another innovative aspect of the subject matter described in this disclosure can be implemented as a method of wireless communication. The method may be performed by a first MLD, and may include receiving a first frame that includes a header including a first field that includes a MLS subfield from a second MLD on a first link of a set of links between the first MLD and the second MLD, the MLS subfield including a set of bits, each bit of the set of bits being associated with a respective link of the set of links; identifying an s-type of MLS control signaling based on a value with which the MLS subfield is configured; and applying the MLS control signaling to each link of a first subset of links, of the set of links, respectively associated with a first subset of bits, of the set of bits, that are configured with a value indicating that the s-type of the MLS control signaling is applicable to the link.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
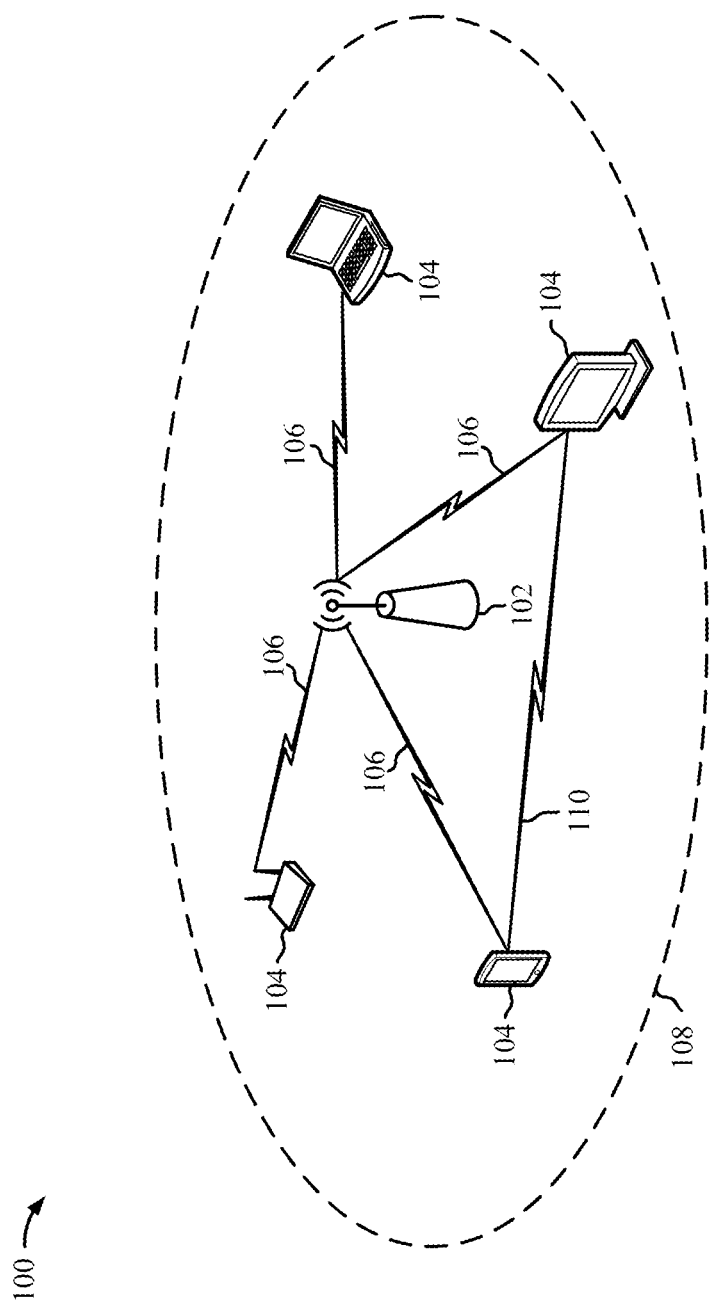
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

As described above, established and widely adopted WLAN communication protocols are designed for wireless communications between two devices on a single link. However, multi-link operation is being developed for the IEEE 802.11 standards. Specifically, multi-link operation may be featured in IEEE 802.11be in relation to Extremely High Throughput (EHT) communications. A WLAN node capable of multi-link operation (MLO), such as an MLO-enabled station (STA) or an MLO-enabled access point (AP), may operate as a multi-link device (MLD) that includes multiple radio interfaces (for example, STA radio interfaces or AP radio interfaces) over which the WLAN node can concurrently transmit and/or receive data associated with one traffic flow. Each of the multiple radio interfaces may operate in a respective frequency band, such as one of the carrier frequencies below seven (7) gigahertz (GHz), which may include the 2.4 GHz band, the 5 GHz band, or the 6 GHz bands.

New WLAN communication protocols are being developed to enable enhanced WLAN communication features (such as higher throughput and wider bandwidth) in even higher carrier frequencies, such as in the 45 GHz or 60 GHz frequency bands, which may further increase the functionality and versatility of MLO to an even greater degree. However, MLO may introduce or exacerbate overhead and complexity commensurate with WLAN signaling. For example, the increase in wireless signaling associated with MLO has the potential to proportionally cause an increase in interference. Furthermore, having multiple radio interfaces physically housed within an AP or an STA (and having antennas in relatively close proximity to one another) may involve more complex coordination and synchronization schemes than those for a single radio interface. Apart from such wireless signaling issues, MLO may be more taxing on a device than conventional single link operation, for instance, in terms of power consumption, processor load, and memory utilization. Thus, as MLO becomes more widely adopted, some enhancements to the signaling between WLAN devices may be beneficial to enable and support one or more traffic flows on multiple different links.

In some WLANs, wireless communication is realized via frames. A frame includes at least a header and a frame body. For example, the header of a frame may include a medium access control (MAC) header that includes multiple fields, some of which may carry control information related to wireless communication in a WLAN. One such field of a MAC header is the High Throughput (HT) Control field defined by earlier and existing versions of the IEEE 802.11 standards. For example, the HT Control field is carried in MAC headers of quality of service (QoS) data (and null data) frames and management frames. As the IEEE 802.11 standards evolved and the related technology advanced, the HT Control field was extended to include some variants, one of which is a High Efficiency (HE) variant called Aggregated Control (A-Control). The HE A-Control variant of the HT Control field is designed to be a flexible and dynamic carrier of control information for various features of the IEEE 802.11 standards, as the original definition of the HT Control field may be unsuitable or inefficient for such features (for example, features of 802.11ax).

Various aspects of the present disclosure relate generally to communicating MLO-related control signaling, and more specifically, to adaption of a Control subfield of an A-Control variant of a Control field. In some examples, the Control subfield of the A-Control variant may be adapted to carry multiple types of multi-link signaling (MLS) control signaling, which may be dynamically selected to suit various situations. The Control subfield of the A-Control variant includes a Control Information subfield paired with a Control Identifier (ID) subfield configurable with a value that indicates the type of control information carried in the Control Information subfield. Thus, a Control subfield may be adapted to carry MLS control signaling by configuring a control ID value of the Control ID subfield with a value that maps to an "MLS" type of control information, and further, by configuring the corresponding Control Information subfield as an MLS subfield. For example, a control ID value that maps to an AP assistance request (AAR) (or maps to a Reserved value) may be redefined to instead map to the "MLS" type of control information, and the corresponding Control Information subfield may be configured with MLS control signaling.

Similar to the manner in which the aforementioned Control subfield may be configured, the MLS subfield may include an MLS Control Information subfield configurable with MLS control signaling and a corresponding S-Type subfield configurable with an s-type value that indicates the type of MLS control signaling carried in the MLS Control Information subfield. Accordingly, a recipient of a frame that includes a header in which the Control subfield is adapted to carry MLS control signaling may be configured to interpret, decode, parse, read, or otherwise use or process the MLS control signaling with which the MLS Control Information subfield is configured based on the s-type value with which the corresponding S-Type subfield is configured.

Particular implementations of the subject matter described in this disclosure can be implemented to realize one or more of the following potential advantages. Techniques described herein may enable MLO-related control information to be dynamically signaled efficiently with little or minimal increase in signaling overhead. For example, aspects of the present disclosure can leverage a header definition such that a header is capable of conveying a greater amount of information without increasing the size of a subfield and without increasing the frame size. In addition, by refraining from statically assigning a control ID value to a single type of control signaling, aspects of the present disclosure provide approaches to conveying MLO-related control information that are both flexible and extensible to account for future enhancements to the 802.11 standards or other wireless technologies.

Still other potential advantages of the subject matter described herein are increased reliability and throughput. In particular, aspects of the present disclosure describe various techniques and approaches for cross-link control information signaling. That is, MLO-related control information that is applicable to one or more links may be communicated over another link, and potentially another link to which the control information is inapplicable. Such cross-link control information signaling may increase one or both of the reliability and throughput of control information transmissions by enabling the control information applicable to at least one link to be communicated over another link.

Still another potential advantage of the subject matter described herein is increased power savings. By adapting the cross-link control information to convey power management (PM) or end of service period (EOSP) information, PM or EOSP configurations may be applied more quickly than sending respective PM or EOSP configurations over the individual links to which those configurations are applicable. The quicker applications of PM or EOSP configurations may enable non-STA APs to place some radio interfaces into a doze state at an earlier time, which may lead to decreased power consumption.

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an AP 102 and multiple STAs 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a MAC address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
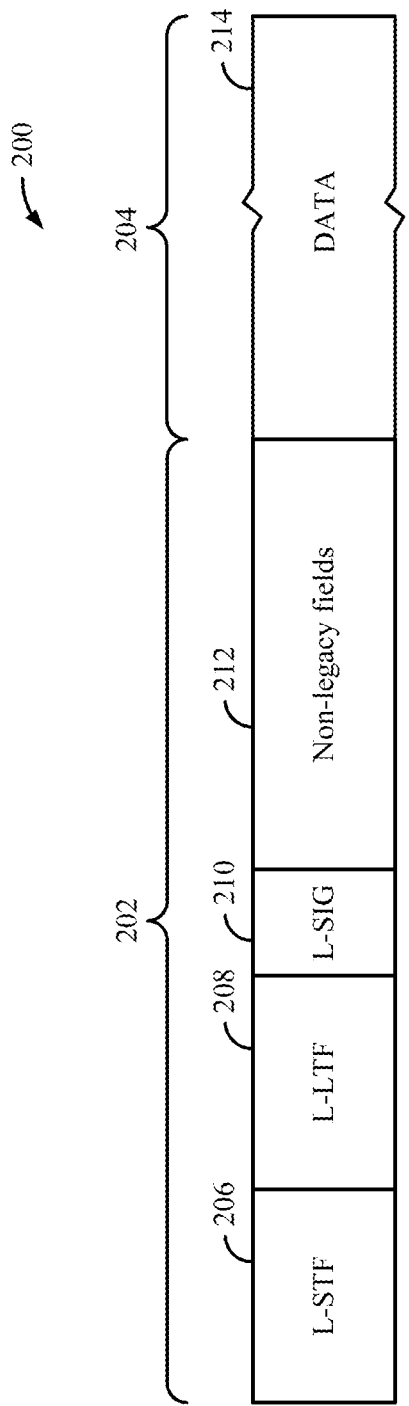
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
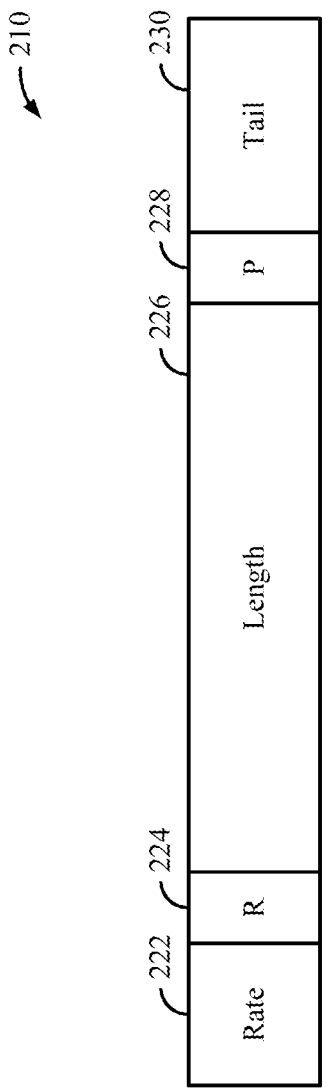
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
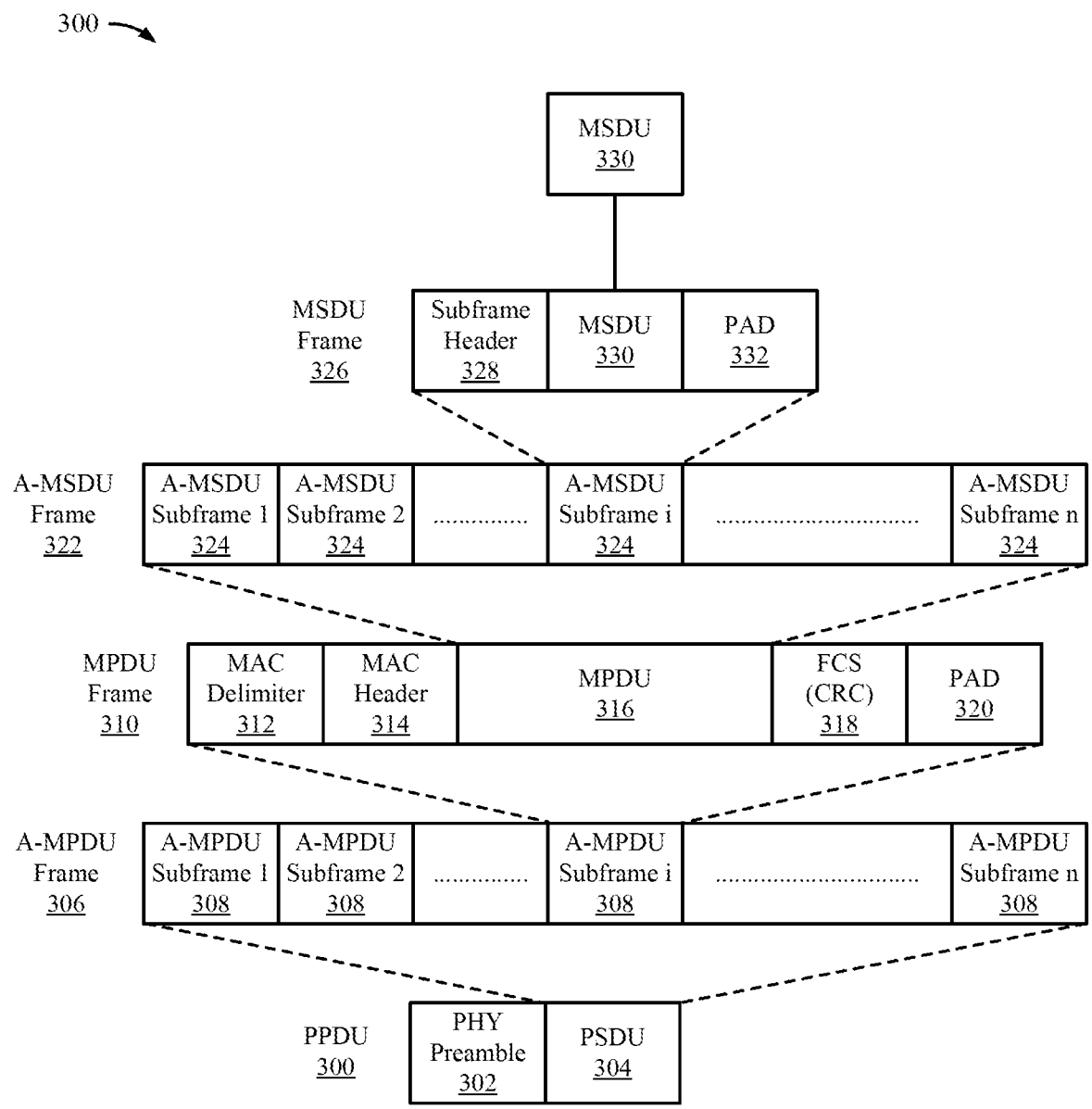
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the MPDU 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the MPDU 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
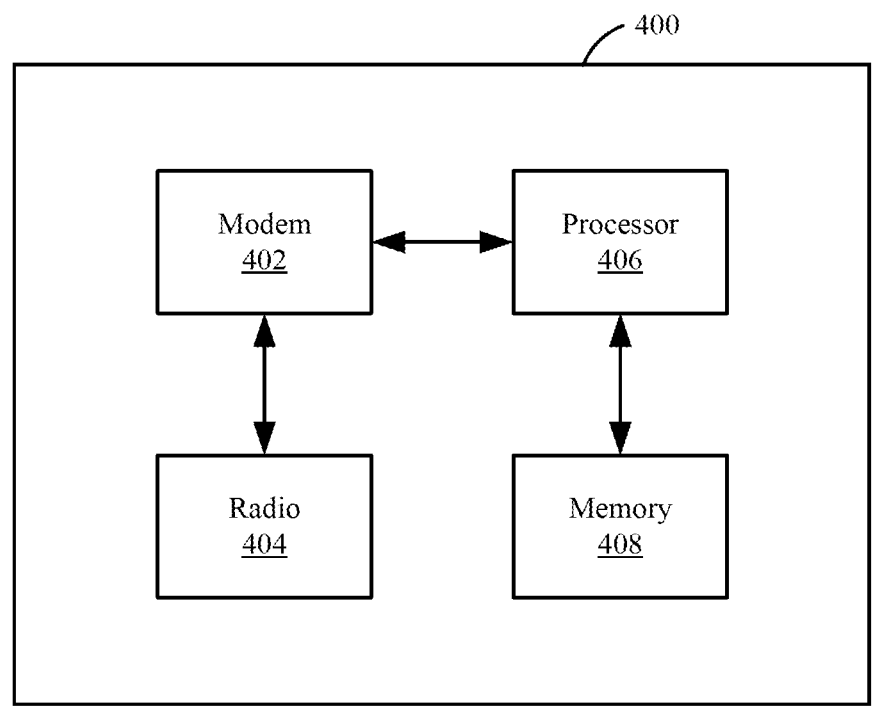
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device 400 can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for UQ imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
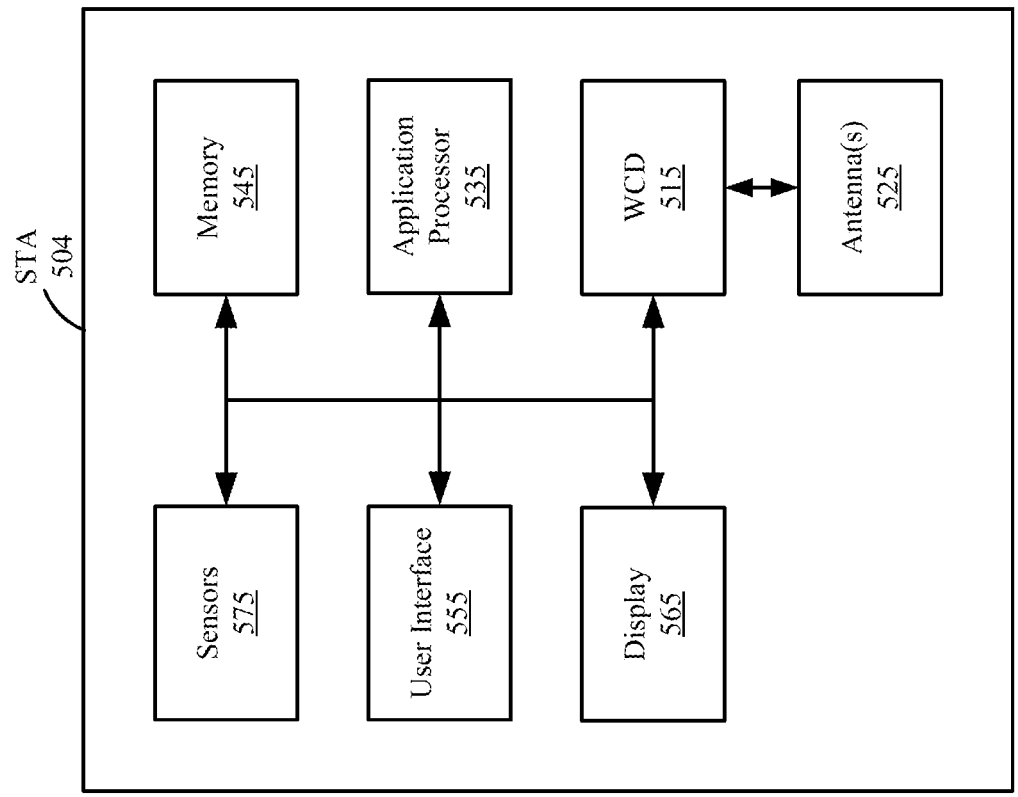
FIG. 5B shows a block diagram of an example STA.
Figure 5A:
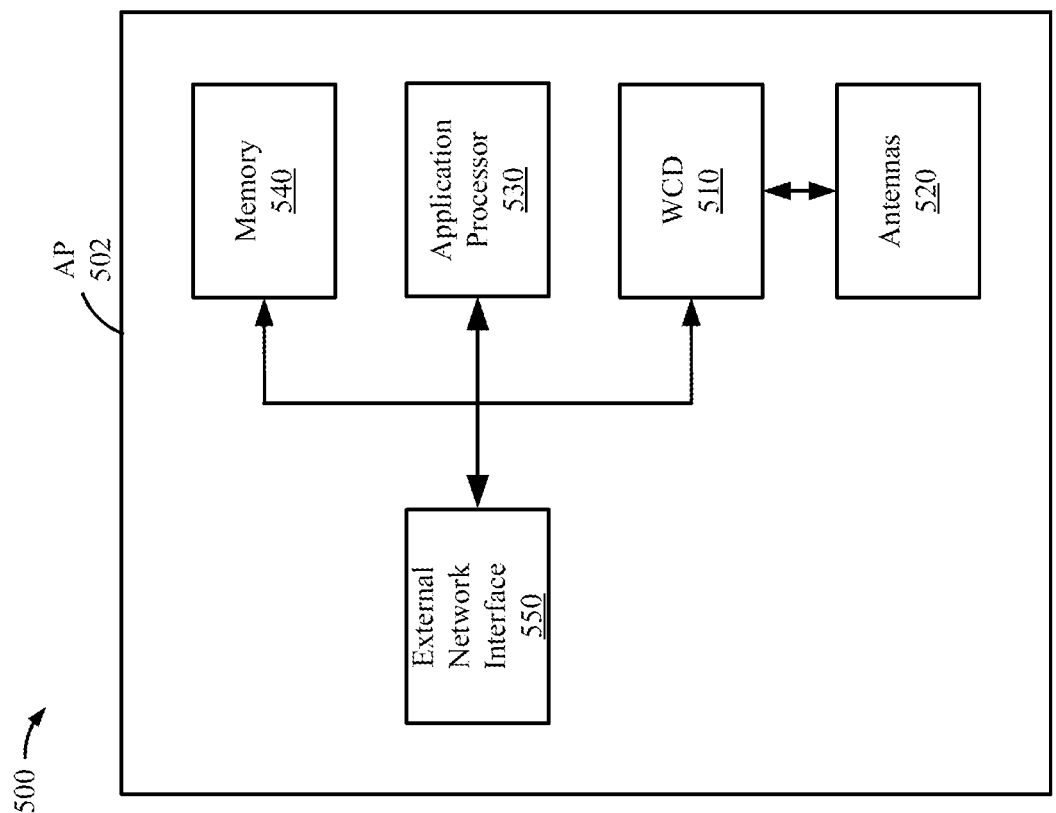
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Various aspects described herein relate generally to MLO control signaling in WLANs, and more particularly, to lightweight, efficient, flexible, and extensible mechanisms for wireless communication of cross-link MLO control signaling in MAC headers. In some aspects, an MLD may utilize one wireless communication link to send control signaling that is applicable to multiple wireless communication links or to a different wireless communications link. More specifically, the MLD may communicate power savings or link recommendation information that is applicable to or identifies multiple wireless communications links in one MAC header of one frame.

In some implementations, the MLD may configure, in a MAC header, a Control ID subfield of an A-Control variant with a value that indicates the corresponding Control Information subfield carries an MLS subfield. For example, a control ID value assigned to AAR, such as "9," may be repurposed to indicate the Control Information subfield corresponding to the Control ID subfield carries MLS control signaling, which may include AAR in addition to other types of MLS control signaling. In such implementations, the MLD may further configure a multi-link signaling (MLS) Signaling Type (S-Type) subfield of the MLS subfield with a value that indicates the type of MLS control signaling carried in an MLS Information subfield. For example, the MLD may configure an MLS S-Type subfield with a value that indicates the corresponding MLS Information subfield carries AAR or a value that indicates the corresponding MLS Information subfield carries multi-link power savings (MLPS) control information. Accordingly, the MLD may configure the corresponding MLS Information subfield with a link ID bitmap identifying one or more links to which the MLS control signaling is applicable. The MLD may output a frame having the configured MAC header for transmission to another MLD, for example, so that the MLS control signaling may be applied by the other MLD or acknowledged by the other MLD before being applied by the MLD.

Figure 6:
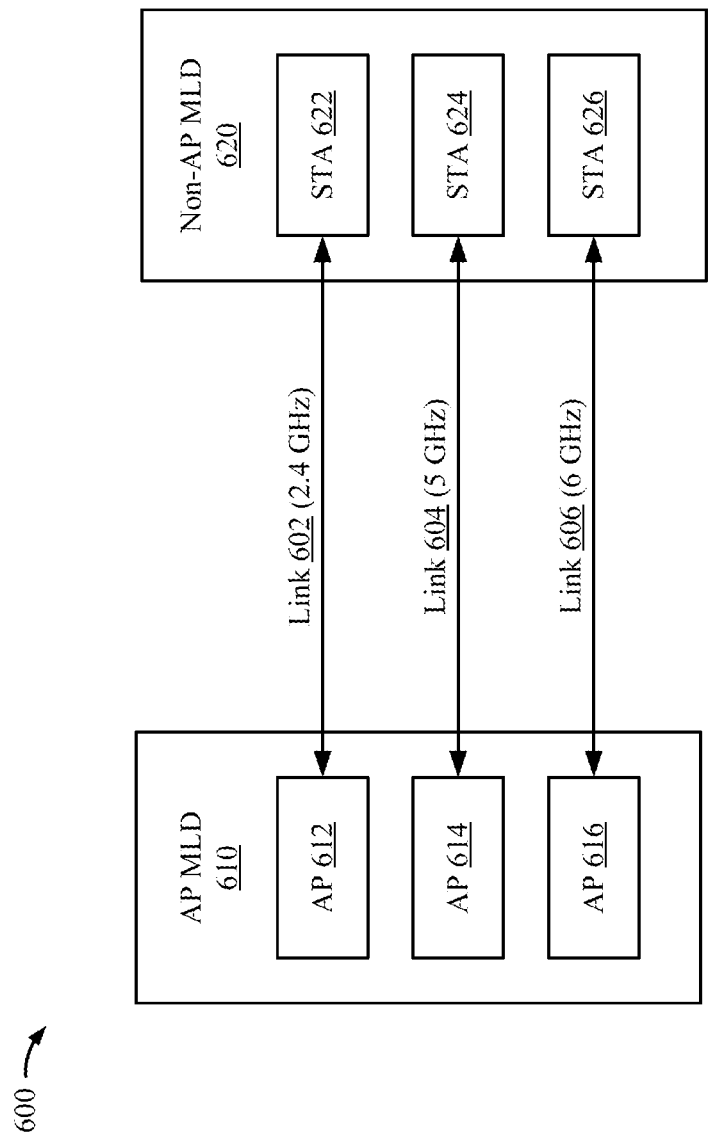
FIG. 6 shows an example communication system that includes an AP multi-link device (MLD) and a non-AP MLD, according to some implementations.

FIG. 6 shows an example communication system 600 that includes an AP MLD 610 and a non-AP MLD 620, according to some implementations. In some implementations, the AP MLD 610 may be one example of the AP 102 of FIG. 1 or the AP 502 of FIG. 5A. In some implementations, the non-AP MLD 620 may be one example of any of the STAs 104 of FIG. 1 or the STA 504 of FIG. 5B.

The AP MLD 610 includes multiple APs 612, 614, and 616 associated with (or operating on) communication links 602, 604, and 606 respectively. In the example of FIG. 6, the AP MLD 610 is shown to include three APs. However, in some implementations, the AP MLD 610 may include fewer or more APs than those depicted in FIG. 6. In some aspects, the APs 612, 614, and 616 may share a common association context (through the AP MLD 610). The APs 612, 614, and 616 also may establish their respective communication links 602, 604, and 606 on different frequency bands. In some implementations, one or more of the APs 612, 614, and 616 may operate at a carrier frequency below 7 GHz (such as in any of the 2.4 GHz, 5 GHz, or 6 GHz frequency bands). For example, in the illustrated aspect, the AP 612 may operate at a carrier frequency in the 2.4 GHz band, the AP 614 may operate at a carrier frequency in the 5 GHz band, and the AP 616 may operate at a carrier frequency of 6 GHz. In some other implementations, one or more of the APs 612, 614, and 616 may operate at a carrier frequency above 7 GHz (such as in the 60 GHz or 45 GHz frequency bands).

The non-AP MLD 620 includes multiple STAs 622, 624, and 626 that may be configured to communicate on the communication links 602, 604, and 606, respectively. In some implementations, one or more of the STAs 622, 624, and 626 may operate at a carrier frequency below 7 GHz (such as in any of the 2.4 GHz, 5 GHz, or 6 GHz frequency bands). For example, in the illustrated aspect, the STA 622 may operate at a carrier frequency in the 2.4 GHz band, the STA 624 may operate at a carrier frequency in the 5 GHz band, and the STA 626 may operate at a carrier frequency of 6 GHz. In some other implementations, one or more of the STAs 622, 624, and 626 may operate at a carrier frequency above 7 GHz (such as in the 60 GHz or 45 GHz frequency bands). In the example of FIG. 6, the non-AP MLD 620 is shown to include three STAs. However, in some implementations, the non-AP MLD 620 may include fewer or more STAs than those depicted in FIG. 6. Existing versions of the IEEE 802.11 standard define several modes in which a non-AP MLD may operate. The various operating modes depend on the number of wireless radios associated with the non-AP MLD and the ability of the non-AP MLD to communicate (such as by transmitting or receiving) concurrently on multiple communication links.

In some implementations, the non-AP MLD 620 may include a single radio or may otherwise be capable of communicating on only one link at a time. In such implementations, the non-AP MLD 620 may operate in a multi-link single-radio (MLSR) mode or an enhanced MLSR (eMLSR) mode. A non-AP MLD operating in the eMLSR mode can concurrently listen on multiple links for specific types of packets, such as buffer status report poll (BSRP) frames or multi-user (MU) request-to-send (RTS) (MU-RTS); however, a non-AP MLD operating in the eMLSR mode can only transmit or receive on one of the links at any given time. For example, the STAs 622, 624, and 626 may concurrently listen on their respective links 602, 604, and 606 during a listen interval. However, if any of the STAs 622, 624, or 626 detects a BSRP frame on its respective link, the non-AP MLD 620 subsequently tunes all of its antennas to the link on which the BSRP frame is detected. By contrast, a non-AP MLD operating in the MLSR mode can only listen to, and transmit or receive on, one communication link at any given time. For example, two of the STAs 622, 624, or 626 be in a power save mode any time one of the STAs 622, 624, or 626 is active.

In some other implementations, the non-AP MLD 620 may include multiple radios and may be capable of concurrent communications on each of the links 602, 604, and 606. In such implementations, the non-AP MLD 620 may operate in a multi-link multi-radio (MLMR) simultaneous transmit and receive (STR) mode or a multi-link multi-radio non-STR (NSTR) mode. A non-AP MLD operating in the MLMR STR mode can simultaneously transmit and receive on multiple links. For example, the STA 622 may transmit or receive on the link 602 while the STA 624 concurrently transmits or receives on the link 604. More specifically, such communications may be asynchronous. In other words, the STA 622 can be transmitting on the link 602 while the STA 624 is receiving on the link 604. By contrast, a non-AP MLD operating in the MLMR NSTR mode can simultaneously transmit and receive on multiple links only if such communications are synchronous. For example, the STAs 622, 624, and 626 may concurrently transmit on the links 602, 604, and 606 and also may concurrently receive on the links 602, 604, and 606. However, the STA 622 cannot be transmitting on the link 602 while the STA 624 is receiving on the link 604.

Still further, in some implementations, a non-AP MLD may include multiple radios but may be capable of concurrent communications on only a subset of the links. In such implementations, the non-AP MLD 620 may operate in an enhanced MLMR (eMLMR) mode or a hybrid eMLSR mode. A non-AP MLD operating in the eMLMR mode supports MLMR STR operation only between some pairs of links. For example, the STAs 622 and 624 may concurrently communicate on their respective links 602 and 604 in accordance with the MLMR STR mode of operation, whereas the STA 626 may not concurrently transmit or receive on its respective link 606 (referred to herein as an "eMLMR link"). In aspects in which the non-AP MLD 620 includes four or more STAs, the STAs associated with the eMLMR links, such as the STA 626 and another similar STA, may "pool" their antennas so that each of the STAs can utilize the antennas of other STAs when transmitting or receiving on one of the eMLMR links. On the other hand, a non-AP MLD operating in the hybrid eMLSR mode supports MLMR STR operation between some pairs of links and eMLSR operation between some other pairs of links.

In some aspects, the AP MLD 610 and the non-AP MLD 620 may communicate cross-link MLS control signaling over one or more of the links 602, 604, and 606. For example, the AP MLD 610 and the non-AP MLD 620 may communicate MLS control signaling that is applicable to two of the links 602 and 604 on another link 606. In some implementations, the MLS control signaling may include a configuration that is common to all of the links indicated in a MAC header. For example, the AP MLD 610 or the non-AP MLD 620 may transmit a frame having a MAC header that includes a field (or subfield) configured with one value that is universally applicable to each of the links identified in a link ID bitmap included in the MAC header. In some other implementations, the MLS control signaling may individually configure communication on the links indicated in a MAC header. For example, the AP MLD 610 or the non-AP MLD 620 may transmit a frame having a MAC header that indicates communication on each of the links should be configured according to a respective value that is individually applicable to each of the links identified in a link ID bitmap included in the MAC header. In some aspects, each of the respective values may be carried in another MAC header of another frame, such as a respective frame most recently received on each of the identified links. Thus, the concepts and various aspects described herein enable a broad range of flexible and extensible options without contributing additional overhead in terms of frame or header size.

Figure 7:
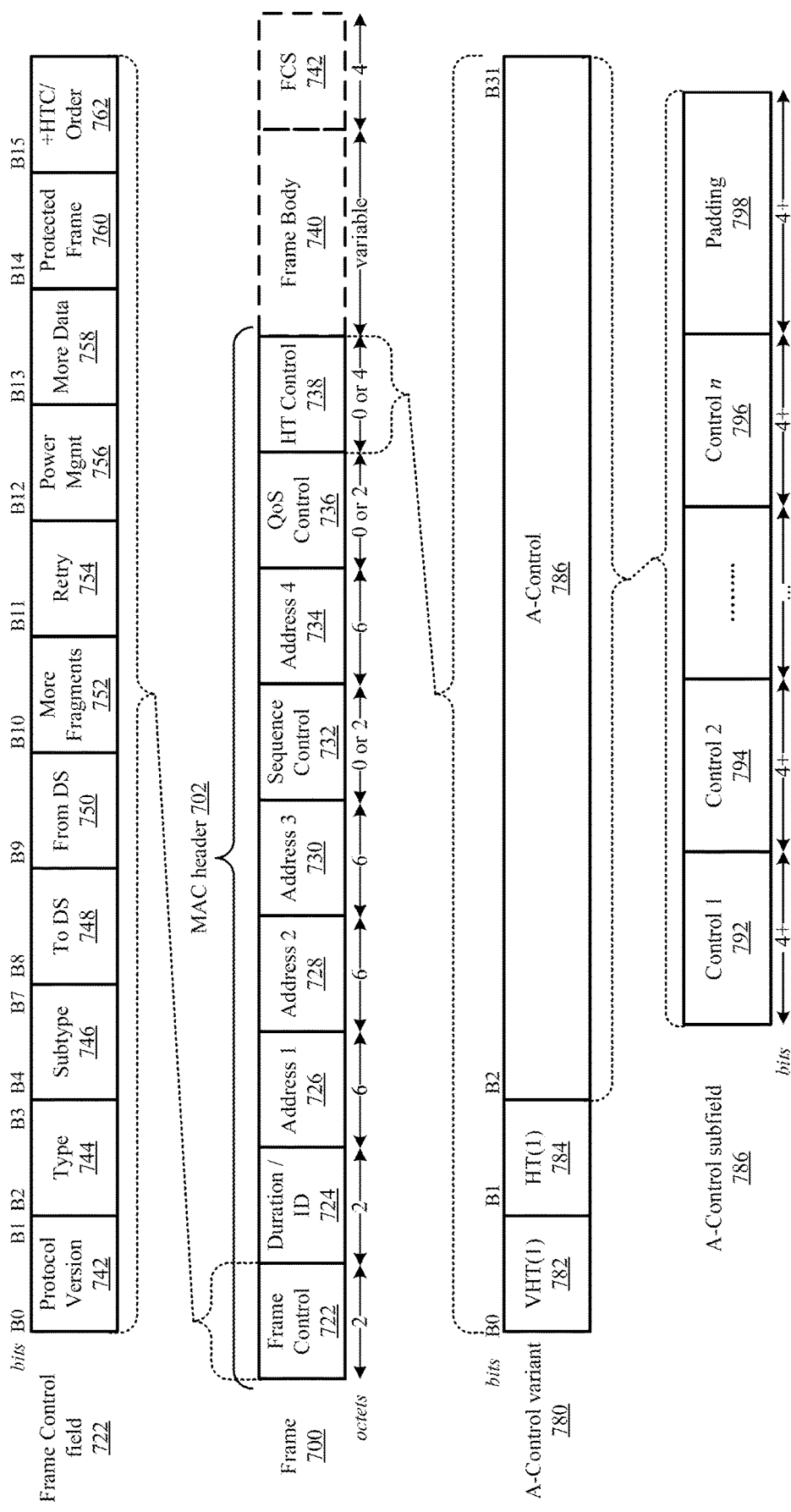
FIG. 7 shows an example medium access control (MAC) header that may be included in a frame, according to some implementations.

FIG. 7 shows an example frame 700 that includes a MAC header 702 with an A-Control variant 780 of an HT Control field 738, according to some implementations. In some aspects, the frame 700 may be an implementation of the MPDU frame 310 and the MAC header 702 may be an implementation of the MAC header 314 shown and described in FIG. 3. In some implementations, the frame 700 may be a data frame or a management frame. For example, the frame 700 may be a QoS null data frame. In some other implementations, the frame 700 may be a control frame or an extension frame. For example, the frame 700 may be a trigger frame.

The frame 700 includes the MAC header 702, the frame body 740, and an FCS 742. The MAC header 702 may include a Frame Control field 722, a Duration/ID field 724, an Address 1 field 726, an Address 2 field 728, an Address 3 field 730, a Sequence Control field 732, an Address 4 field 734, a QoS Control field 736, and an HT Control field 738.

The Frame Control field 722 includes basic control information, such as protocol version, frame type, frame transmitter, intended receiver, and so forth. More specifically, the Frame Control field 722 includes a Protocol Version subfield 742, a Type subfield 744, a Subtype subfield 746, a To Distribution System (DS) subfield 748, a From DS subfield 750, a More Fragments subfield 752, a Retry subfield 754, a Power Management (Mgmt) subfield 756, a More Data subfield 758, a Protected Frame subfield 760, and a +High Throughput Control (HTC)/Order subfield 762.

As described above, the HT Control field 738 may be configured as an HE A-Control variant 780. For example, by setting each of a Very HT (VHT) subfield 782 and a HT subfield 784 to a certain value(s), such as "1," the HT Control field 738 may be configured as the A-Control variant 780. The A-Control variant 780 includes the A-Control subfield 786, which itself includes one or more Control subfields 792, 794, and 796 (note that while three Control subfields are illustrated, more or fewer Control subfields can be configured). The A-Control subfield 786 may be configured with padding 798 (such as a set of zero bits), for example, when the amount of control signaling with which the Control subfields are configured is less than the size of the A-Control subfield.

Each of the Control subfields 792, 794, and 796 may be composed of one or more sets of a Control ID subfield paired with a Control Information subfield. Each Control ID subfield includes a value that indicates the type of control information carried in the corresponding Control Information subfield. The existing IEEE 802.11 standards statically define types of control information that can be carried by the A-Control variant, as shown below by Table 1:

TABLE 1

Control ID subfield values

| Control ID value | Meaning | Length of the Control Information subfield (in bits) | Content of the Control Information subfield |
|---|---|---|---|
| 0 | Triggered response scheduling (TRS) | 26 | TRS control |
| 1 | Operating mode (OM) | 12 | OM control |
| 2 | HE link adaptation (HLA) | 26 | HLA control |
| 3 | Buffer status report (BSR) | 26 | BSR control |
| 4 | Uplink power headroom (UPH) | 8 | UPH control |
| 5 | Bandwidth query report (BQR) | 10 | BQR control |
| 6 | Command status (CAS) | 8 | CAS control |
| 7 | Extremely high throughput (EHT) operating mode (OM) (EHT OM) | 6 | EHT OM control |
| 8 | Single response scheduling (SRS) | 10 | SRS control |
| 9 | AP assistance request (AAR) | 20 | AAR control |
| 10-14 | Reserved | | |
| 15 | Ones need expansion surely (ONES) | 26 | All set to "1" |

In an illustrative example shown by Table 1, a control ID value of "3" maps to BSR control content, meaning that the corresponding control information should be interpreted as a BSR from the transmitter. Illustratively, an STA that transmits a frame in which the Control ID subfield is configured with a value of "3" indicates that the corresponding Control Information subfield is configured with a BSR. Thus, an AP that receives the frame from the STA may find the control ID value of "3" and may interpret the control information with which the corresponding Control Information subfield is configured as a BSR from the STA.

Figure 8:
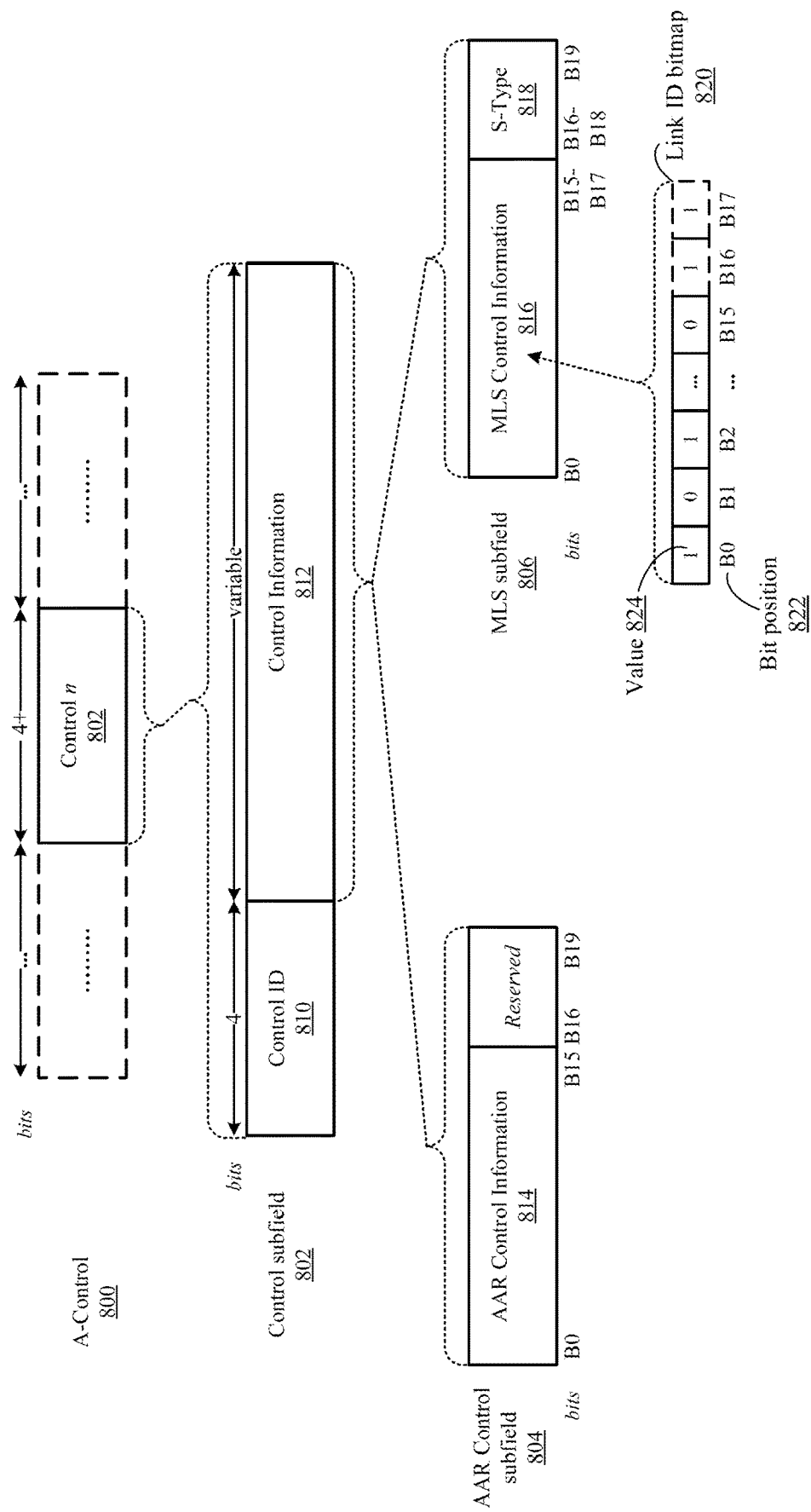
FIG. 8 shows an example Control subfield of an Aggregated Control (A-Control) subfield of a MAC header, according to some implementations.

FIG. 8 shows an example Control subfield 802 of an A-Control subfield 800 of a MAC header, according to some implementations. The Control subfield 802 includes two subfields: a Control ID subfield 810 and a Control Information subfield 812. The Control ID subfield 810 is configurable with a value that defines the type of control information with which the Control Information subfield 812 is configured, as described above with respect to FIG. 7 and Table 1.

As illustrated by Table 1, each of the supported control ID values is statically mapped to one type of control information, which is neither flexible nor extensible. In particular, a Control ID subfield 810 may be set to the value "9," which corresponds to AAR. Thus, upon receiving a frame having a MAC header in which the HT Control field is an A-Control variant, an STA (or AP) may be aware that the A-Control subfield variant includes control information that is associated with an AP assistance request, and may interpret the control information of the AAR Control Information subfield 814 as a set of link IDs of assisting APs affiliated with an AP MLD that are requested to assist a non-AP STA affiliated with a non-AP MLD, belonging to an NSTR link pair, to recover its medium synchronization. For example, the AAR Control Information subfield 814 may include an assisting AP link ID bitmap that indicates the link ID(s) associated with the link(s) of the assisting AP(s) affiliated with an AP MLD, where each assisting AP is solicited to transmit a Trigger frame to its associated non-AP STA that belongs to the same NSTR link pair as the non-AP STA that sent the AAR Control Information subfield 814. In the assisting AP link ID bitmap, one value (such as "1") in a bit position i indicates that a link ID i is the link ID of an assisting AP affiliated with the AP MLD, whereas another value (such as "0") in the bit position i indicates that the link ID i is not the link ID of the assisting AP affiliated with the AP MLD. The bit in the assisting AP link ID bitmap that corresponds to the AP to which the AAR Control subfield is addressed is set to "0."

While AAR is applicable to MLO, AAR is a rather specific use case, and the number of values that the Control ID subfield is capable of conveying (the Control ID subfield can carry four bits) is finite. Therefore, the static assignment of a control ID value to AAR alone may be inefficient and may prohibit (or contribute to prohibiting) the A-Control variant from carrying other MLO-related control information that may be used more frequently or may be of a relatively greater importance, criticality, or urgency.

Furthermore, the remaining control ID values (that is, "10" through "14") may be insufficient to convey each different type of MLO-related control signaling that may be communicated. Even if the remaining reserved control ID values were sufficient to convey the currently defined types of MLO-related control signaling, such a static definition is inflexible and fails to anticipate future MLO extensions to the 802.11 standards.

Instead of following the static control ID assignments dictated by existing IEEE 802.11 standards, the Control subfield 802 of the A-Control variant can be adapted to carry multiple types of MLS control signaling, which may be dynamically indicated depending upon the use case. For example, a control ID value supported for the Control ID subfield 810 may be used to indicate that the corresponding Control Information subfield 812 includes an MLS subfield 806.

In some implementations, a control ID value that is already assigned to a particular type of control information can be reassigned to indicate the content of the Control Information subfield 812 is configured with an s-type value indicating how to interpret, decode, parse, read, process, use, and so forth corresponding MLS control information carried in the MLS subfield 806. The type of control information previously associated with the reassigned control ID value may be available as one of the types of MLS control information able to be conveyed via the MLS subfield 806. The structure of the subfield being replaced by or absorbed into the MLS subfield 806, such as the AAR Control subfield 804, may be repurposed or redefined, according to different implementations.

As an AAR Control subfield 804 is already defined to carry AAR control information, which is related to MLO, the AAR control information logically commends itself to being carried in the MLS subfield 806. Therefore, the control ID value of "9" mapped to AAR control information may be remapped to the MLS subfield 806. In some aspects, the AAR subfield 804 may become deprecated by virtue of being absorbed in the MLS subfield 806.

In some implementations, a control ID value that is reserved or unused (such as one of control IDs 10-14) may be assigned to indicate the content of the Control Information subfield 812 includes the MLS subfield 806, effectively redefining the previously reserved or unused control ID values as used for MLS control information. For example, the reserved control ID value of "10" may be mapped to the MLS subfield 806.

Similar to the Control subfield 802, the MLS subfield 806 may be itself composed of two subfields: an MLS Control Information subfield 816 and an S-Type subfield 818. In some implementations, the S-Type subfield 818 may span two to four bits, for example, beginning at one of bit positions B16, B17, or B18 of the control information of the Control Information subfield 812 and ending at bit position B19 of the control information of the Control Information subfield 812.

The S-Type subfield 818 may correspond to an MLS Control Information subfield 816 with which the S-Type subfield 818 is paired in a Control Information subfield 812 of one Control n subfield 802. That is, the S-Type subfield 818 may be configured with an s-type value that indicates the type of signaling carried in the MLS Control Information subfield 816.

In this way, the MLS subfield 806 may be structured similarly to the Control subfield 802, in that one subfield may be configured with a value that indicates the way in which the control information with which a corresponding subfield is configured is to be interpreted, decoded, parsed, read, or otherwise used or processed. Accordingly, in some implementations, the s-type with which the S-Type subfield 818 is configured in the MLS subfield 806 may indicate the way in which the MLS control information with which the MLS Control Information subfield 816 is configured is to be interpreted, decoded, parsed, read, or otherwise used or processed. Such a relationship between the S-Type subfield 818 and the MLS Control Information subfield 816 may be similar to the relationship between the Control ID subfield 810 and the Control Information subfield 812 included in a Control subfield 802 of an A-Control variant 800 of the HT Control field (such as the HT Control field 738 shown and described with respect to FIG. 7).

In some implementations, the supported s-type values with which the S-Type subfield 818 may be configured may include a set of numbers, such as four, eight, or sixteen integers that each is mapped to a respective type of MLS control signaling. Table 2, below, illustrates an example of the types of MLS control signaling that the MLS subfield may be capable of conveying. Table 2 provides one example of potential mappings for s-type values with which the S-Type subfield 818 could be configured. In some other examples, more or fewer s-type values may be mapped to different types of MLS control signaling, different s-type values may be used, or different types of MLS control signaling may be carried.

TABLE 2

S-Type subfield values

| S-type value | Meaning | Length of the Control Information subfield (in bits) | Content of the Control Information subfield |
|---|---|---|---|
| 0 | AAR | 16-18 | AAR Control |
| 1 | MLPS (PM bit of same frame) | 16-18 | MLPS Control (non-AP MLD → AP MLD) |
| 2 | MLPS (PM bit of most recent respective frame) | 16-18 | MLPS Control (AP MLD → non-AP MLD) |
| 3 | MLPS (EOSP bit of same frame) | 16-18 | MLPS Control (AP MLD → non-AP MLD) |
| 4 | MLPS (EOSP bit of most recent respective frame) | 16-18 | MLPS Control (AP MLD → non-AP MLD) |
| 5 | MLO link recommendation | 16-18 | MLO link recommendation control |
| 6 | Link data rate adjustment | 16-18 | Link data rate control |
| 7 | Reliable MLO/ redundancy | 16-18 | Reliable MLO control/ redundancy control |
| 8 | Multi-link control response | 16-18 | Multi-link control response control |
| 9 | Multi-link mode transition | 16-18 | Multi-link mode transition control |
| 10 | Multi-link RTS/clear to send (CTS) | 16-18 | Multi-link RTS/CTS control |
| 10-15 | Reserved | | |

As the MLS subfield 806 includes two subfields 816 and 818, the subfield structure of the AAR subfield 804 may be converted into a subfield structure having a sufficient size to convey the S-Type subfield 818 and the MLS Control Information subfield 816. For example, as the AAR subfield 804 may include a set of four bits at bit positions B16-B19, that is reserved according to the AAR Control Information subfield definition. While the four bit positions B16-B19 may be otherwise reserved or unused for the AAR subfield 804, the bits at the set of four bit positions B16-B19, or a subset of the set, may be configurable with an s-type value that indicates or conveys the MLS content carried or conveyed at the (preceding) bits at bit positions B0-B15 of the Control Information subfield 812. For example, rather than marked as reserved, a set of four bits may be carried at the bit positions B16-B19, which may extend the amount of information being conveyed without extending the size of the Control Information subfield 812. In some implementations, the S-Type subfield 818 may include more or fewer bit positions. For example, the S-Type subfield 818 may include two bits at bit positions B18-B19 or three bits at bit positions B17-B19 in order to convey four or eight different types of MLS control signaling.

The S-Type subfield 818 may correspond to an MLS Control Information subfield 816, which may carry information identifying one or more links of a set of links (such as a set of links between an MLD and another MLD) to which the s-type of MLS control signaling is applicable and one or more other links of the set of links to which the s-type of MLS control signaling is inapplicable. In some implementations, the MLS Control Information subfield 816 may begin at bit position B0 of the MLS subfield 806 (when the Control Information subfield 812 is indicated as carrying the MLS subfield 806). The MLS Control Information subfield 816 may span multiple bit positions. For example, depending upon whether the S-Type subfield 818 spans two, three, or four bit positions, the MLS Control Information subfield 816 may be sixteen, seventeen, or eighteen bits wide, and therefore, may span bit positions B0-B15, B0-B16, or B0-B17, respectively.

In some example implementations, the MLPS control signaling may include a link bitmap or link ID bitmap 820 carried in the MLS Control Information subfield 816. The link ID bitmap 820 may include a set of bits respectively located at a set of bit positions of the link ID bitmap 820. Each of the bit positions in the link ID bitmap 820 may correspond to a respective link of a set of links between one MLD and another MLD, such as an AP MLD and a non-AP MLD. The bit at a bit position in the link ID bitmap 820 is applicable to the link to which the bit position corresponds, and therefore, the bit position indicates an association between the bit at the bit position and the corresponding link. In other words, the $n^{th}$ bit in the link ID bitmap 820 represents link n. For example, a bit position 822 of B0 may map to a link ID of 0 (although other mappings are possible). Accordingly, the value 824 of "1" with which the bit at the bit position 822 is configured may be associated with a link having a link ID of 0.

The value with which a bit at a bit position is configured may indicate whether the s-type of the MLS control signaling is applicable to the link having the link ID to which the bit position maps. Illustratively, a bit configured with a value of "1" at a bit position may indicate that the s-type of MLS control signaling is applicable to the link having the link ID to which the bit position maps. Correspondingly, a bit configured with a value of "0" at a bit position may indicate that the s-type of MLS control signaling is inapplicable to the link having the link ID to which the bit position maps. As illustrated by the link ID bitmap 820, the s-type of MLS control signaling conveyed by the S-Type subfield 818 may be applicable to links having link IDs to which bit positions [B0, B2, . . . , B16, B17] map, whereas the s-type of MLS control signaling may be inapplicable to links having link IDs to which bit positions [B1, . . . , B15] map.

The s-types of MLS control signaling that may be applicable to links between MLDs may include power savings and management, link recommendation, link enablement/ disablement, data rate on the link, data or information redundancy on the link (such as data or information duplication), multi-link control response on a link, multi-link mode transitions on a link, multi-link RTS/CTS for frame exchanges on a link, and other control signaling that may benefit from or may be compatible with a lightweight, extensible, and flexible mechanism to convey the type and applicability of control signaling for multiple links between MLDs.

As an illustrative example, a control ID value of x may be mapped to MLS control content (for example, x may be 9 or 10 or another integer similar to the control ID values 0-9 mapped to respective content of the Control Information subfield 812). With the control ID value of x mapped to MLS control content, configuring the Control ID subfield 810 with a control ID value of x indicates that the Control Information subfield 812 carries the MLS subfield 806. Therefore, an MLD that identifies a frame as having the control ID of the Control ID subfield 810 configured with x may determine that the MLS subfield 806 is carried in the Control Information subfield 812 corresponding to the Control ID subfield 810.

The MLD may interpret, decode, read, or parse the control information of the Control Information subfield 812 so that the MLD identifies the two subfields of the MLS subfield 806. In some implementations, the MLD may read the bits at bit positions B16-B19 of the MLS subfield 806 in order to identify the s-type indicated in the S-Type subfield 818, which may indicate the type of MLS control signaling carried in the MLS Control Information subfield 816. For example, consistent with Table 2, above, an MLD may read the bits "0001" at bit positions B16-B19 of the MLS subfield 806 and, based on the mapping of the s-type value of "1" shown in Table 2, above, the MLD may identify the s-type of the MLS control signaling to be MLPS control signaling in which a PM bit of the same MAC header carrying the MLS subfield 806 is to be applied.

The MLD may read the bits at bit positions B0-B15 in order to identify the links to which the s-type of MLS control signaling is applicable. For example, the value of "1" may indicate that the s-type of MLS control signaling is applicable to the link corresponding to the bit position in which the bit at that bit position is configured with the value of "1." Complementarily, the value of "0" may indicate that the s-type of MLS control signaling is inapplicable to a link corresponding to a bit position in which a bit at that bit position is configured with the value of "0." For example, in the illustrated aspect, the link ID bitmap 820 includes bits configured with the value of "1" at bit positions 0 and 3; therefore, the s-type of the MLS control signaling may be applicable to the links corresponding to the bit positions 0 and 3, such as the links having link IDs 0 and 3. Complementarily, the s-type of the MLS control signaling may be inapplicable to the links corresponding to the bit positions 1 and 2, such as the links having link IDs 1 and 2.

In some implementations, the s-type of the MLS control signaling may include MLPS control signaling initiated by a non-AP MLD, for example, in order to conserve power of the non-AP MLD. For example, the s-type may be configured with the value "0001," which is equivalent to the decimal number one. Following Table 2, above, in such an example, the MLS control signaling mapped to an s-type of one is MLPS control signaling in which a PM bit of the same frame carrying the MLS subfield is to be applied to each link of a set of links corresponding to a respective bit position of a set of bit positions in the MLS subfield at which a bit is configured with the value "1." In the context of FIG. 7, the value of the Power Mgmt subfield 756 of the MAC header 702 would apply to the links corresponding to bit positions B0 and B3 of the link ID bitmap 820, regardless of the link on which the MAC header 702 is sent.

In another example, the s-type may be configured with the value "0010," which is equivalent to the decimal number two. Following Table 2, above, in such an example, the MLS control signaling mapped to an s-type of two indicates that the MLPS control signaling involves each link that corresponds to a respective bit position of a set of bit positions in the MLS subfield at which a bit is configured with the value "1" having applied thereto a respective PM bit of a frame most recently received on the same link. In the context of FIG. 7, a non-AP MLD may apply a value of a Power Mgmt subfield 756 of a MAC header 702 most recently received on a link to that same link where the link corresponds to one of bit positions B0 and B3 of the link ID bitmap 820 in which a bit is configured with a "1" (in such an other example, the MAC header 702 may be in a different frame than the MAC header that includes the link ID bitmap 820).

In some other implementations, the s-type of the MLS control signaling may include MLPS control signaling initiated by an AP MLD, for example, in order to conserve power of a non-AP MLD. For example, the s-type may be configured with the value "0011," which is equivalent to the decimal number three. Following Table 2, above, in such an example, the MLS control signaling may be MLPS control signaling in which an EOSP bit of the same frame carrying the MLS subfield is to be applied to each link of a set of links corresponding to a respective bit position of a set of bit positions in the MLS subfield at which a bit is configured with the value "1." In the context of FIG. 7, a value of a bit in an EOSP bit position of the QoS Control field 736 of the MAC header 702 would apply to the links corresponding to bit positions B0 and B3 of the link ID bitmap 820, regardless of the link on which the MAC header 702 is sent.

In another example of such other implementations, the s-type may be configured with the value "0100," which is equivalent to the decimal number four. Following Table 2, above, in such an example, the MLS control signaling mapped to an s-type of four indicates that the MLPS control signaling involves each link that corresponds to a respective bit position of a set of bit positions in the MLS subfield at which a bit is configured with the value "1" having applied thereto a respective EOSP bit of a frame most recently received on the same link. In the context of FIG. 7, a non-AP MLD may apply, on a link, a value of a bit in an EOSP bit position of the QoS Control field 736 of the MAC header 702 most recently received on that same link where the link corresponds to one of bit positions B0 and B3 of the link ID bitmap 820 in which a bit is configured with a "1" (in such an other example, the MAC header 702 may be in a different frame than the MAC header that includes the link ID bitmap 820).

In some further implementations, the s-type of the MLS control signaling may include the s-type may be configured with the value "0101," which is equivalent to the decimal number five. Following Table 2, above, in some examples of such further implementations, the MLS control signaling mapped to an s-type of five includes MLS link recommendation. In some aspects, when the s-type of the MLS control signaling is mapped to MLS link recommendation, then the link ID bitmap 820 may include a set of bits in which the $n^{th}$ bit represents a link n of a set of links between the AP MLD and the non-AP MLD. An $n^{th}$ bit of the link ID bitmap 820 that is set to "1" may indicate that the link n is recommended for frame transmissions between the transmitting one of the AP MLD and the non-AP MLD, whereas an $n^{th}$ bit of the link ID bitmap 820 that is set to "0" may indicate that the link n is not recommended for frame transmissions between the transmitting one of the AP MLD and the non-AP MLD. In some aspects, link recommendations may apply to Data frames that are scheduled to be sent by an STA of the non-AP MLD, where the STA is the intended recipient of the MLS subfield 806. For example, link recommendations may be limited to Data from a particular flow, such as Data frames having a traffic ID (TID) that matches a value carried in a TID subfield of a QoS frame including the MLS subfield 806. However, MLS control signaling of link recommendations may apply to any type of frame (such as Management frames).

In another example, rather than indicating whether a link is recommended or not recommended, the MLS control signaling may indicate whether a link is enabled or disabled. In other words, the MLS control signaling may indicate a use instruction either allowing a link to be used or prohibiting a link to be used. An $n^{th}$ bit of the link ID bitmap 820 that is set to "1" may indicate that the link n is enabled for frame transmissions between the transmitting one of the AP MLD and the non-AP MLD, whereas an $n^{th}$ bit of the link ID bitmap 820 that is set to "0" may indicate that the link n is disabled for frame transmissions between the transmitting one of the AP MLD and the non-AP MLD.

In some additional implementations, the s-type of the MLS the s-type of the MLS control signaling may include the s-type may be configured with the value "0110," which is equivalent to the decimal number six. Following Table 2, above, in some examples of such further implementations, the MLS control signaling mapped to an s-type of six includes MLS link data rate adjustment (or fast multi-link adaptation). In some aspects, when the s-type of the MLS control signaling is mapped to MLS link data rate adjustment, then the link ID bitmap 820 may include a set of bits in which the $n^{th}$ bit represents a link n of a set of links between the AP MLD and the non-AP MLD. An $n^{th}$ bit of the link ID bitmap 820 that is set to "1" may indicate that the data rate for the link n is to be increased (or decreased, depending upon the implementation), whereas an $n^{th}$ bit of the link ID bitmap 820 that is set to "0" may indicate that the data rate for the link n is not to be increased (or decreased, depending upon the implementation).

In still other implementations, the s-type of the MLS the s-type of the MLS control signaling may include the s-type may be configured with the value "0111," which is equivalent to the decimal number seven. Following Table 2, above, in some examples of such further implementations, the MLS control signaling mapped to an s-type of seven includes reliable MLO/redundancy control. In some aspects, when the s-type of the MLS control signaling is mapped to reliable MLO/redundancy control, then the link ID bitmap 820 may include a set of bits in which the $n^{th}$ bit represents a link n of a set of links between the AP MLD and the non-AP MLD. An $n^{th}$ bit of the link ID bitmap 820 that is set to "1" may indicate that data redundancy should be enabled on the link n, whereas an $n^{th}$ bit of the link ID bitmap 820 that is set to "0" may indicate that data redundancy on the link n should not be enabled (or should be disabled).

In yet other implementations, the s-type of the MLS the s-type of the MLS control signaling may include the s-type may be configured with the value "1000," which is equivalent to the decimal number eight. Following Table 2, above, in some examples of such further implementations, the MLS control signaling mapped to an s-type of eight includes MLS control response. In some aspects, when the s-type of the MLS control signaling is mapped to MLS control response, then the link ID bitmap 820 may include a set of bits in which the $n^{th}$ bit represents a link n of a set of links between the AP MLD and the non-AP MLD. An $n^{th}$ bit of the link ID bitmap 820 that is set to "1" may indicate that an immediate control response should be sent on the link n, whereas an $n^{th}$ bit of the link ID bitmap 820 that is set to "0" may indicate that an immediate control response is not configured or may remain unchanged on the link n.

In still further implementations, the s-type of the MLS the s-type of the MLS control signaling may include the s-type may be configured with the value "1001," which is equivalent to the decimal number nine. Following Table 2, above, in some examples of such further implementations, the MLS control signaling mapped to an s-type of nine includes MLS mode transition. In some aspects, when the s-type of the MLS control signaling is mapped to MLS mode transition, then the link ID bitmap 820 may include a set of bits in which the $n^{th}$ bit represents a link n of a set of links between the AP MLD and the non-AP MLD. An $n^{th}$ bit of the link ID bitmap 820 that is set to "1" may indicate the mode that is to be set on the link n, such as eMLSR, eMLMR, or NSTR, depending upon the implementation. Illustratively, where the mode on each link of a set of links is set to MLMR, the bits of the link ID bitmap 820 set to "1" may indicate that each of the corresponding links should have its mode set to eMLMR. Conversely, an $n^{th}$ bit of the link ID bitmap 820 that is set to "0" may indicate that the mode on the link n should remain unchanged.

In even further implementations, the s-type of the MLS the s-type of the MLS control signaling may include the s-type may be configured with the value "1010," which is equivalent to the decimal number ten. Following Table 2, above, in some examples of such further implementations, the MLS control signaling mapped to an s-type of ten includes MLS RTS/CTS. In some aspects, when the s-type of the MLS control signaling is mapped to MLS RTS/CTS, then the link ID bitmap 820 may include a set of bits in which the $n^{th}$ bit represents a link n of a set of links between the AP MLD and the non-AP MLD. An $n^{th}$ bit of the link ID bitmap 820 that is set to "1" may indicate an RTS/CTS on the link n, whereas an $n^{th}$ bit of the link ID bitmap 820 that is set to "0" may not indicate an RTS/CTS on the link n.

Referring to FIGS. 9 through 12, a non-AP MLD may include multiple STAs, each of which may be configured to communicate with a respective AP of an AP MLD over a link. Each of the STAs may be able to operate in one of at least two PM modes: active mode or PS mode. In active mode, an STA of the non-AP MLD is in an awake power state in which an STA radio is constantly powered so that the STA can transmit and receive. In PS mode, however, an STA of the non-AP MLD 920 primarily operates in a doze power state in which an STA radio is unable to transmit or receive and power consumption is low, but the STA occasionally transitions to the awake power state to receive frames that may be buffered at the AP MLD.

The AP MLD may instruct the STAs of the non-AP MLD to operate in one of the PM modes via the MAC header of a frame. For example, the QoS Control field of the MAC header may be used to indicate a PM mode to one or more of the STAs. An implementation of the QoS Control field is shown and described in FIG. 7 by the QoS Control field 736. The QoS Control field may include at least one bit dedicated to conveying an EOSP indication. For example, a bit position in the QoS Control field may be dedicated to conveying an EOSP indication so that when the non-AP MLD reads the bit at that bit position in the QoS Control field, the non-AP MLD will be informed of the PM mode in which to operate.

When one of the APs of the AP MLD has frames to transmit to a respective one of the STAs, the AP may keep the STA in an active mode in which the STA radio on a corresponding one of the links remains awake while the AP transmits frames to the STA over the corresponding link. During frame transmission and while the AP still has frames to transmit to the STA, the AP may set the EOSP bit in the QoS Control field to a value indicating that the STA should remain in the active PM mode so that the STA radio is awake on the corresponding link. For example, the AP may set the EOSP bit to "0" to indicate to the STA that the end of the service period for the STA has not been reached.

Once an AP has finished transmitting frames to an STA, the AP may allow the STA to doze an STA radio on the corresponding link. For example, in the last frame or most recent frame having a QoS Control field, such as the last frame of a sequence of frames transmitted by an AP to an STA, the AP may configure the EOSP bit at the EOSP bit position in the QoS Control field with a value that indicates EOSP. For example, the AP may set the EOSP bit to "1." When an STA receives an EOSP bit indicating the EOSP, the STA may again be allowed to doze an STA radio on the corresponding link, and therefore, the STA may enter the PS mode. An AP may record and track the PM mode of a corresponding STA so that the AP is aware of whether the STA is awake on the link (when the STA is in an active mode) or whether the STA is in the awake state or the doze state on the link (when the STA is in a PS mode).

Figure 9:
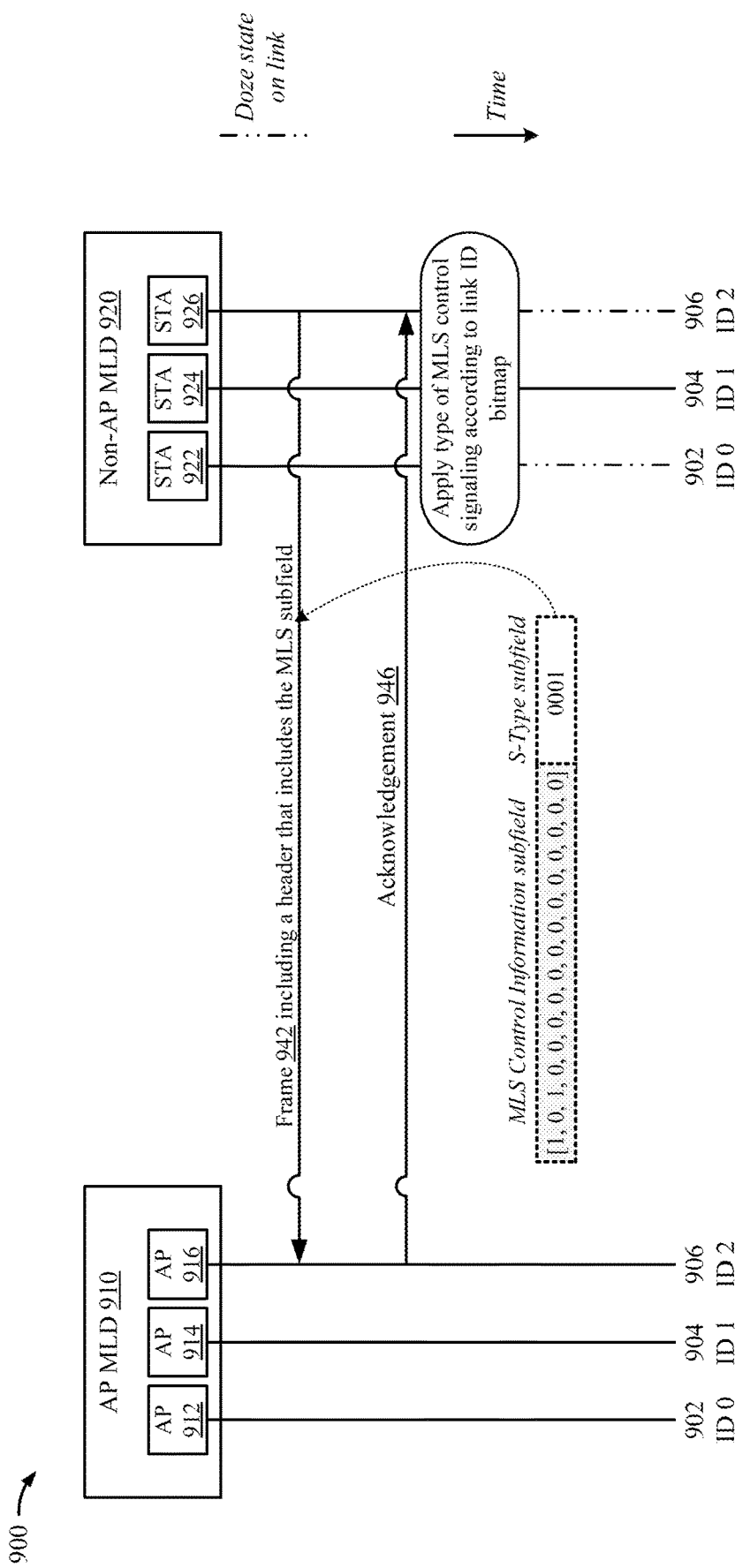
FIG. 9 shows a sequence diagram depicting an example of wireless communication of cross-link multi-link signaling (MLS) control signaling between an AP MLD and a non-AP MLD in a wireless local area network (WLAN), according to some implementations.

FIG. 9 shows a sequence diagram depicting an example of wireless communication of cross-link MLS control signaling between an AP MLD 910 and a non-AP MLD 920 in a WLAN 900, according to some implementations. The non-AP MLD 920 may include multiple STAs 922, 924, and 926, each of which may be configured to communicate with a respective one of the APs 912, 914, and 916 of the AP MLD 910 over a respective one of the links 902, 904, and 906.

In some implementations, the AP MLD 910 may be one example of the AP 102 of FIG. 1 or the AP 502 of FIG. 5A. In some other implementations, the AP MLD 910 may be one example of the AP MLD 610 of FIG. 6, and accordingly, the APs 912, 914, and 916 may be examples of the APs 612, 614, and 616, respectively. In some implementations, the non-AP MLD 920 may be one example of any of the STAs 104 of FIG. 1 or the STA 504 of FIG. 5B. In some other implementations, the non-AP MLD 920 may be one example of the non-AP MLD 620 of FIG. 6, and accordingly, the STAs 922, 924, and 926 may be examples of the STAs 622, 624, and 626, respectively.

An STA of the non-AP MLD 920 may request to transition from one PM mode to another PM mode. To do so, the STA of the non-AP MLD 920 informs a corresponding AP of the AP MLD 910 via a successful frame exchange in which the STA of the non-AP MLD 920 transmits a frame to the AP of the AP MLD 910 indicating the intention of the STA of the non-AP MLD 920 to transition to the other PM mode and the AP of the AP MLD 910 acknowledges successful reception of the frame. In other words, the STA of the non-AP MLD 920 may refrain from transitioning to another PM mode, such as the PS mode, and may refrain from dozing on a link until the PM mode request conveyed by the PM bit in the MAC header has been (implicitly or explicitly) acknowledged by the corresponding AP of the AP MLD 910. Upon receiving the acknowledgement, the STA of the non-AP MLD 920 may transition from one PM mode to the other PM mode, which may allow the non-AP MLD 920 to doze its radio on a corresponding link.

The information indicating the transition to the other PM mode is conveyed via a bit value carried in a PM subfield of a Frame Control field of a MAC header, such as the Power Mgmt subfield 756 shown and described in FIG. 7. The AP MLD 910 may maintain a record of which STAs are active on which links and the whether an STA is active power state or a doze power state on a corresponding link.

Illustratively, the non-AP MLD 920 may prefer to doze its radios on two links 902, 906 having link IDs 0 and 2, respectively. To do so, the non-AP MLD 920 may generate a frame 942 including a MAC header that includes an MLS subfield. The MAC header may further include a PM subfield. In some examples, the non-AP MLD 920 may configure a PM bit in the PM subfield to a value of "1" to indicate a request to place at least one of the STAs 922, 924, and 926 into a PS mode in which the at least one of the STAs 922, 924, and 926 may doze on at least one of the links 902, 904, and 906, respectively. In some other examples, the non-AP MLD 920 may configure a PM bit in the PM subfield to a value of "0" to indicate a request to place at least one of the STAs 922, 924, and 926 into an active mode in which the at least one of the STAs 922, 924, and 926 is awake on at least one of the links 902, 904, and 906, respectively.

The non-AP MLD 920 may configure an s-type of an S-Type subfield of the MLS subfield with a value (such as "0001" or "1" according to Table 2, above) indicating that the MLS subfield included in the frame 942 includes MLPS control signaling in which the PM bit carried in the PM subfield is applicable to each of the links indicated in a link ID bitmap carried in an MLS Control Information subfield of the MLS subfield. As illustrated in FIG. 9, for example, the non-AP MLD 920 may request to apply the PM bit in the MAC header of the frame 942 to the STAs 922 and 926 on the links 902 and 906 having the IDs 0 and 2, respectively, and therefore, the non-AP MLD 920 may configure the first bit (such as the bit at bit position B0) and the third bit (such as the bit at bit position B2) to a value of "1." As the non-AP MLD 920 is not requesting to apply the PM bit to the STA 924, the non-AP MLD 920 may configure the bit at the bit position B1 corresponding to the link 904 with a "0."

In some aspects, the non-AP MLD 920 may further configure the bits at the bit positions that do not correspond to any links with a "0." For example, the non-AP MLD 920 may configure the bits at the bit positions B3 through B15 with a "0" because only three links 902, 904, and 906 corresponding to bit positions B0, B1, and B2 have been set up with the AP MLD 910.

The non-AP MLD 920 may transmit the frame 942 including the header that includes the PM bit (such as a PM bit configured with "1" or "0") and includes the MLS subfield to the AP MLD 910 on one of the links 902, 904, or 906 (such as the link 906) via a respective STA of the STAs 922, 924, or 926 (such as the STA 926). Correspondingly, the AP MLD 910 may receive the frame 942 including the header that includes the MLS subfield from the non-AP MLD 920 on the one of the links 902, 904, or 906 (such as the link 906) via a respective AP of the APs 912, 914, or 916 (such as the AP 916). In some implementations, the frame 942 may be transmitted and received on any of the links 902, 904, and 906, as the MLS Control Information subfield may carry cross-link information. Thus, even if one of the links 902, 904, or 906 is unavailable, MLS control signaling may nonetheless be communicated for that link on another one of the links 902, 904, or 906 via the MLS subfield.

Based on the frame 942, the AP MLD 910 may identify the STAs 922 and 926 on the links 902 and 906 to which the non-AP MLD 920 is requesting to apply the PM bit. For example, the AP MLD 910 may read the bits of the link ID bitmap carried in the MLS Control Information subfield to find the first and third bits at bit positions B0 and B2, respectively, are configured with a value of "1" indicating that the MLS control signaling (here, the PM bit) is applicable to the first and third links 902 and 906 having the link IDs 0 and 2. The AP MLD 910 may ignore the bits at bit positions that do not correspond to any links—for example, the AP MLD 910 may ignore the bits at bit positions B3 through B15 because the AP MLD 910 has not set up any links outside of the three links 902, 904, and 906 corresponding to the bit positions B0, B1, and B2, respectively.

The AP MLD 910 may identify the STAs 922 and 926 operating on the links 902 and 906 and corresponding to the APs 912 and 916, respectively, based on the link ID bitmap having the bits at the first and third bit positions configured with a value of "1." The AP MLD 910 may record information indicating the PM mode of the identified STAs 922 and 926 according to value with which the PM bit of the frame 942 is configured. For example, the AP MLD 910 may signal the value of the PM bit of the frame 942 to the APs 912 and 916 operating on the links 902 and 906, respectively. Each of the APs 912 and 916 may update the PM mode of a respective STA of the STAs 922 and 926 according to the PM bit signaled thereto.

The AP MLD 910 may transmit an acknowledgement 946 to the non-AP MLD 920 on one of the links 902, 904, or 906. In some aspects, the AP MLD 910 may transmit the acknowledgement 946 via the same AP of the APs 912, 914, or 916 that received the frame 942 on the respective one of the links 902, 904, or 906. For example, the AP MLD 910 may transmit the acknowledgement 946 via the AP 916 that received the frame 942 on the link 906. The acknowledgement 946 may itself be a frame that carries information indicating the AP MLD 910 (or the APs 912 and 916) acknowledges the non-AP MLD 920 (or the STAs 922 and 926) is applying the PM bit of the frame 942 to the STAs 922 and 926 on the corresponding links 902 and 906, respectively.

The non-AP MLD 920 may receive the acknowledgement from the non-AP MLD 920 on one of the links 902, 904, or 906. In some aspects, the non-AP MLD 920 may receive the acknowledgement 946 via the same STA of the STAs 922, 924, or 926 that transmitted the frame 942 on the respective one of the links 902, 904, or 906. For example, the non-AP MLD 920 may receive the acknowledgement 946 via the STA 926 that received the frame 942 on the link 906.

Based on the acknowledgement 946, the non-AP MLD 920 may apply the PM bit of the frame 942 to each of the STAs 922 and 926 operating on the links 902 and 906, respectively, that correspond to the bit positions in the link ID bitmap of the MLS subfield having bits configured with a value of "1." For example, the non-AP MLD 920 may apply the PM bit to the STAs 922 and 926, such as by placing the STAs 922 and 926 in a PS mode when the non-AP MLD 920 configures the PM bit of the frame 942 with a "1." When placed into the PS mode, the STAs 922 and 926 may enter a doze state on the links 902 and 906, respectively.

Figure 10:
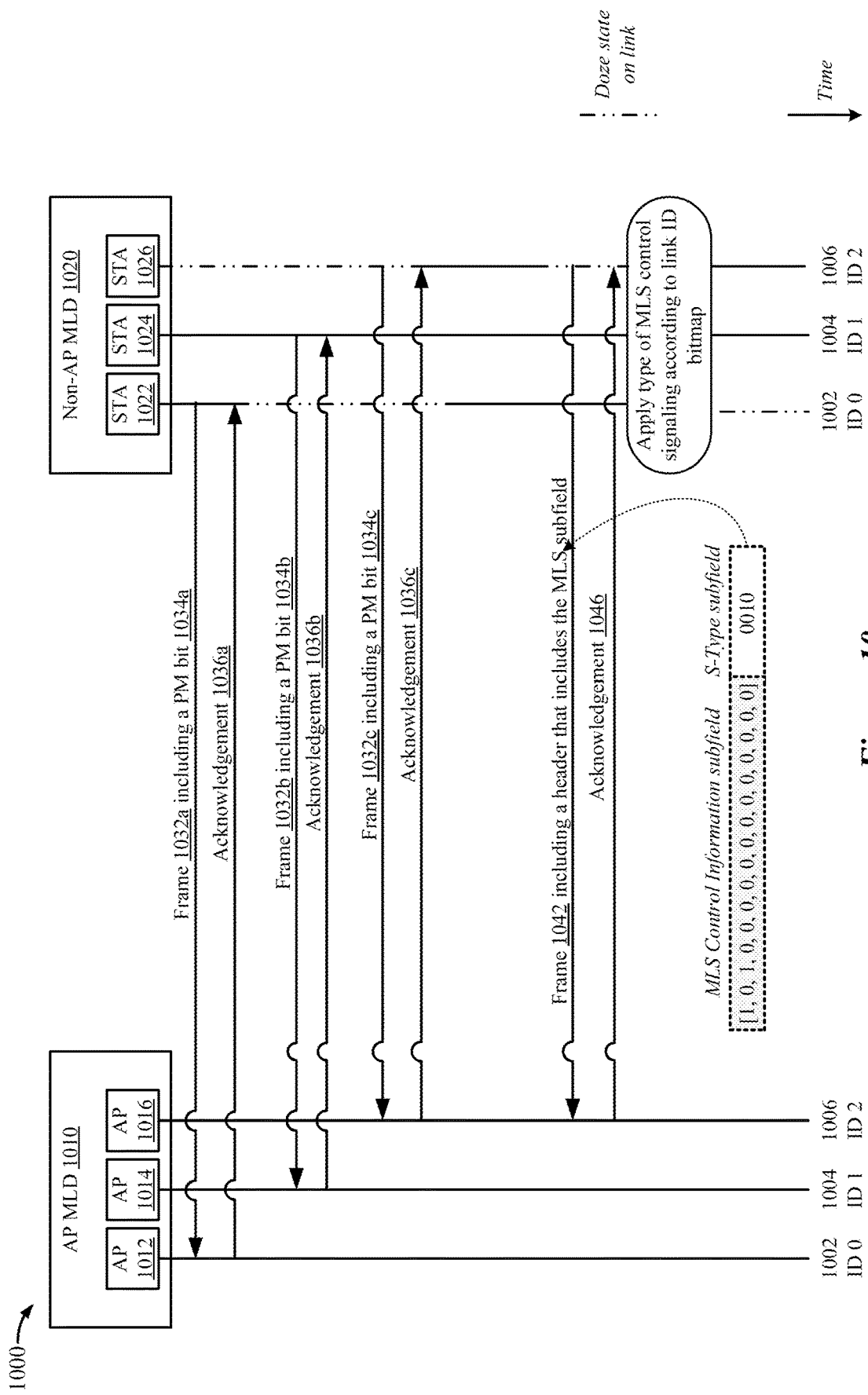
FIG. 10 shows a sequence diagram depicting another example of wireless communication of cross-link MLS control signaling between an AP MLD and a non-AP MLD in a WLAN, according to some implementations.

FIG. 10 shows a sequence diagram depicting another example of wireless communication of cross-link MLS control signaling between an AP MLD 1010 and a non-AP MLD 1020 in a WLAN 1000, according to some implementations. The non-AP MLD 1020 may include multiple STAs 1022, 1024, and 1026, each of which may be configured to communicate with a respective one of the APs 1012, 1014, and 1016 of the AP MLD 1010 over a respective one of the links 1002, 1004, and 1006.

In some implementations, the AP MLD 1010 may be one example of the AP 102 of FIG. 1 or the AP 502 of FIG. 5A. In some other implementations, the AP MLD 1010 may be one example of the AP MLD 610 of FIG. 6, and accordingly, the APs 1012, 1014, and 1016 may be examples of the APs 612, 614, and 616, respectively. In still further implementations, the AP MLD 1010 may be one example of the AP MLD 910 of FIG. 9, and accordingly, the APs 1012, 1014, and 1016 may be examples of the APs 912, 914, and 916, respectively.

In some implementations, the non-AP MLD 1020 may be one example of any of the STAs 104 of FIG. 1 or the STA 504 of FIG. 5B. In some other implementations, the non-AP MLD 1020 may be one example of the non-AP MLD 620 of FIG. 6, and accordingly, the STAs 1022, 1024, and 1026 may be examples of the STAs 622, 624, and 626, respectively. In still further implementations, the non-AP MLD 1020 may be one example of the non-AP MLD 920 of FIG. 9, and accordingly, the STAs 1022, 1024, and 1026 may be examples of the STAs 922, 924, and 926, respectively.

Each of the STAs 1022, 1024, and 1026 may operate in a respective PM mode that is independent of the other STAs. For example, the STAs 1022 and 1024 may be operating in an active mode and so may remain awake on the links 1002 and 1004, respectively, whereas the STA 1026 may be operating in a PS mode and so may doze on the link 1006. In some aspects, the non-AP MLD 1020 may transmit individual requests for each of the STAs 1022, 1024, and 1026 for a certain PM mode. In some such aspects, an STA transmits, on the associated link, a frame that includes a header including a Frame Control field that includes a PM subfield. The PM subfield may include a bit that can be configured with a value indicating the PM mode being requested for an STA. For example, a PM bit configured with the value of "1" may indicate a request for an STA to operate in a PS mode, whereas a PM bit configured with a value of "0" may indicate a request for an STA to operate in an active mode.

In the illustrated example, the STA 1022 may transmit, to the AP 1012 on the link 1002, a frame 1032a that includes a PM bit 1034a, which may be set to "1" to indicate a request to operate in a PS mode on the link 1002. The AP 1012 may receive the frame 1032a, and assuming the AP MLD 1010 accepts the requested mode, the AP MLD 1010 may update the mode of the STA 1022 from the active mode to the PS mode requested via the PM bit 1034a. The AP 1012 may transmit, to the STA 1022 on the link 1002, an acknowledgement 1036a indicating that the requested mode of operation is acknowledged and accepted. When the STA 1022 receives the acknowledgement 1036a, the non-AP MLD 1020 may place the STA 1022 into the PS mode. In the PS mode, the STA 1022 may doze on the link 1002. For example, the non-AP MLD 1020 may send a signal to a radio of the STA 1022 used for communication over the link 1002, and the signal may indicate that the radio is to enter a lower power state in which the STA 1022 is not listening on the link 1002 or is only listening at certain intervals.

Similarly, the STA 1024 may transmit, to the AP 1014 on the link 1004, a frame 1032b that includes a PM bit 1034b, which may be set to "0" to indicate a request to operate in an active mode on the link 1004. The AP 1014 may receive the frame 1032b, and assuming the AP MLD 1010 accepts the requested mode, the AP MLD 1010 may preserve the active mode of the STA 1024, as requested via the PM bit 1034a. The AP 1014 may transmit, to the STA 1024 on the link 1004, an acknowledgement 1036b indicating that the requested mode of operation is acknowledged and accepted. Therefore, when the STA 1024 receives the acknowledgement 1036b, the non-AP MLD 1020 may signal the STA 1024 to remain in the active mode. For example, the non-AP MLD 1020 may send a signal to a radio of the STA 1024 used for communication over the link 1004, and the signal may indicate that the radio is to remain in a higher power state in which the STA 1024 is in an awake state and listening on the link 1004.

Similarly, the STA 1026 may transmit, to the AP 1016 on the link 1006, a frame 1032c that includes a PM bit 1034c, which may be set to "1" to indicate a request to operate in an active mode on the link 1006. The AP 1016 may receive the frame 1032c, and assuming the AP MLD 1010 accepts the requested mode, the AP MLD 1010 may update the mode of the STA 1026 to reflect the active mode requested via the PM bit 1034c. The AP 1016 may transmit, to the STA 1026 on the link 1006, an acknowledgement 1036c indicating that the requested mode of operation is acknowledged and accepted. When the STA 1026 receives the acknowledgement 1036c, the non-AP MLD 1020 may keep the STA 1026 in the active mode in which the STA 1026 remains in an active state on the link 1006. For example, the non-AP MLD 1020 may send a signal to a radio of the STA 1026 used for communication over the link 1006, and the signal may indicate that the radio is to transition from a lower power mode (of the PS mode) to a higher power state (of the active mode) so that the radio of the STA 1026 remains in an awake state on the link 1006.

The non-AP MLD 1020 may be configured to request, via the MLS subfield, a change in PM modes on multiple links at an individual link level of granularity. In contrast to the aspects and examples described with respect to FIG. 9, above, in which the non-AP MLD 920 requests a change in PM modes on multiple links at a multi-link level (that is, one value of one PM bit is applied to all of the multiple links). For example, the non-AP MLD 1020 may generate a frame 1042 including a header that includes an MLS subfield (for example, as illustrated and described with respect to FIG. 8). The non-AP MLD 1020 may transmit the frame 1042 to the AP MLD 1010 via one of the STAs 1022, 1024, and 1026 on one of the respective links 1002, 1004, and 1006.

The non-AP MLD 1020 may configure an s-type of the S-Type subfield of the MLS subfield with a value indicating that the MLS control signaling includes MLPS control information, from the non-AP MLD 1020 and to be acknowledged by the AP MLD 1010, that requests, for each of the links corresponding to a bit position in the link ID bitmap having a bit configured with a certain value (such as "1"), the PM bit of a respective frame received on the link be applied for the STA operating on the link. For example, the respective frame may be a frame (having a PM bit configured with a value) that is most recently transmitted by the STA on the link or a frame most recently acknowledged by the AP on the link.

Illustratively, the non-AP MLD 1020 may configure an s-type of the S-Type subfield with a value of "0010" (or "2"), which according to Table 2, above, corresponds to MLPS control information indicating a request from a non-AP MLD to an AP MLD to apply, on each of the links corresponding to a bit position of a link ID bitmap having a bit configured with a certain value, a PM bit from a respective frame that is most recently received on the link. The STA 1022 may be operating in a PS mode and dozing on the link 1002 pursuant to the acknowledged PM bit 1034*a* of the frame 1032*a*, but the STA 1022 may have been subsequently transitioned back into the active mode at a later time (for example, based on receiving, from the AP 1012 on the link 1002, a beacon frame indicating that the AP 1012 has data to send to the STA 1022). Where the non-AP MLD 1020 would again request to place the STA 1022 into the PS mode, the non-AP MLD 1020 may indicate such a request via reference to the frame 1032*a*, which may be the most recently acknowledged frame having the PM bit 1034*a* configured with a value. Accordingly, the non-AP MLD 1020 may configure the s-type of the S-Type subfield with the value "0010" and may configure a bit at a bit position (such as bit position B0 corresponding to ID 0 of the link 1002) in the link ID bitmap that corresponds to the link 1002 with a value (such as "1") indicating that the MLPS control information of the s-type is applicable thereto.

Conversely, the non-AP MLD 1020 may refrain from requesting a change to the PM mode of the STA 1024. Therefore, the non-AP MLD 1020 may configure a bit at a bit position (such as bit position B1 corresponding to ID 1 of the link 1004) in the link ID bitmap that corresponds to the link 1004 with a value (such as "0") indicating that the MLPS control information of the s-type is inapplicable thereto.

The STA 1026 may be operating in an active mode and awake on the link 1006 pursuant to the acknowledged PM bit 1034*c* of the frame 1032*c*, but the STA 1026 may have been subsequently transitioned back into the PS mode at a later time (for example, based on an EOSP bit of a frame received from the AP 1012 on the link 1002). Where the non-AP MLD 1020 would again request to keep the STA 1026 in the active mode, the non-AP MLD 1020 may indicate such a request via reference to the frame 1032*c*, which may be the most recently acknowledged frame having the PM bit 1034*c* configured with a value. Accordingly, the non-AP MLD 1020 may configure a bit at a bit position (such as bit position B2 corresponding to ID 2 of the link 1006) in the link ID bitmap that corresponds to the link 1006 with a value (such as "1") indicating that the MLPS control information of the s-type is applicable thereto.

The AP MLD 1010 may receive the frame 1042 having the header that includes the MLS subfield, and based on the information with which the MLS subfield is configured, may identify the s-type of MLS control signaling. For example, the AP MLD 1010 may access information indicating at least a portion of Table 2, stored in memory of the AP MLD 1010, to find the s-type of MLS control signaling that is mapped to the value of "0010." The AP MLD 1010 may determine that the s-type corresponds to the MLPS control information indicating a request from a non-AP MLD to an AP MLD to apply, on each of the links corresponding to a bit position in the link ID bitmap having a bit configured with a certain value, a PM bit from a respective frame that is most recently received on the link.

For example, the AP MLD 1010 may identify the links 1002 and 1006 as having the MLPS control information being applicable thereto based on the link ID bitmap bit positions that correspond to the links 1002 and 1006 having bits configured with the value of "1." The AP MLD 1010 may further determine the PM bits 1034*a* and 1034*c* included in the frames 1032*a* and 1032*c* most recently received on the links 1002 and 1006, respectively. The AP MLD 1010 may update the PM mode of the STA 1022 on the link 1002 to the PS mode based on the PM bit 1034*a* of the frame 1032*a* being configured with a value of "1," and may update the PM mode of the STA 1026 on the link 1006 to reflect the active mode based on the PM bit 1034*c* of the frame 1032*c* being configured with a value of "0." The AP MLD 1010 may signal the AP 1012 on the link 1002 that the STA 1022 on the link 1002 is transitioning to the PS mode, and may signal the AP 1016 on the link 1006 that the STA 1026 on the link 1006 is remaining in the active mode. One of the APs 1012, 1014, and 1016, such as the AP 1016 that received the frame 1042, may transmit an acknowledgement 1046 associated with the frame 1042 to the non-AP MLD 1020.

The STA 1026 may receive the acknowledgement 1046, which may indicate to the non-AP MLD 1020 that the PM bits 1034*a* and 1034*c* from the respective most recently transmitted frames 1032*a* and 1032*c* may be applied to each link associated with a bit in the link ID bitmap configured with a value indicating that the MPLS control information is applicable to the link. Accordingly, the non-AP MLD 1020 may apply the PM bits 1034*a* and 1034*c* on the links 1002 and 1006, respectively. For example, the non-AP MLD 1020 may signal the STA 1022 to transition to the PS mode, in which the STA 1022 may doze on the link 1002, but may signal the STA 1026 to remain in the active mode, in which the STA 1026 remains awake on the link 1006.

Figure 11:
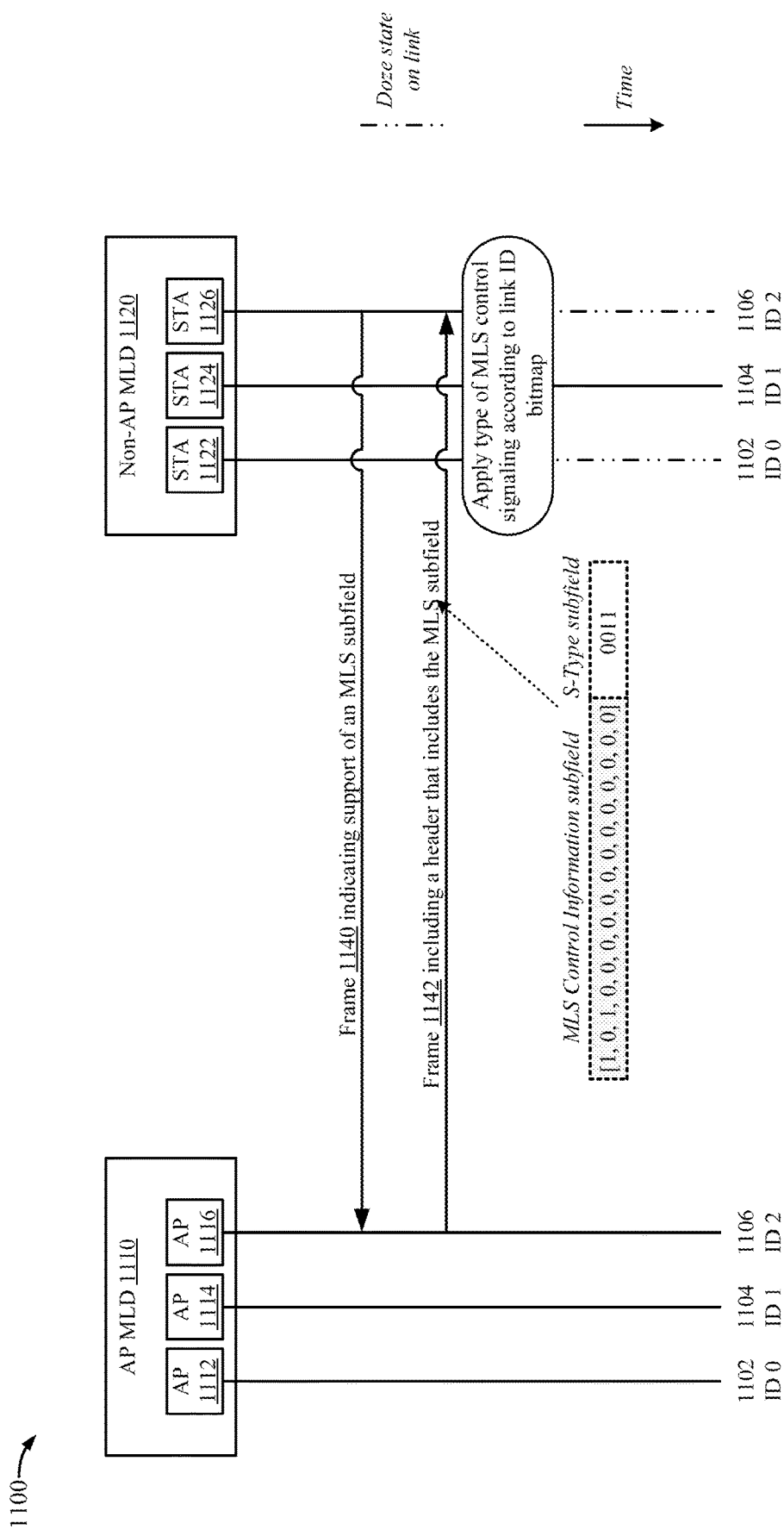
FIG. 11 shows a sequence diagram depicting yet another example of wireless communication of cross-link MLS control signaling between an AP MLD and a non-AP MLD in a WLAN, according to some implementations.

FIG. 11 shows a sequence diagram depicting yet another example of wireless communication of cross-link MLS control signaling between an AP MLD 1110 and a non-AP MLD 1120 in a WLAN 1100, according to some implementations. In some implementations, the AP MLD 1110 may be one example of the AP 102 of FIG. 1 or the AP 502 of FIG. 5A. In some other implementations, the AP MLD 1110 may be one example of the AP MLD 610 of FIG. 6, and accordingly, the APs 1112, 1114, and 1116 may be examples of the APs 612, 614, and 616, respectively. In still further implementations, the AP MLD 1110 may be one example of the AP MLD 910 or the AP MLD 1010 of FIGS. 9 and 10, respectively, and accordingly, the APs 1112, 1114, and 1116 may be examples of the APs 912, 914, and 916, or the APs 1012, 1014, and 1016, respectively.

In some implementations, the non-AP MLD 1120 may be one example of any of the STAs 104 of FIG. 1 or the STA 504 of FIG. 5B. In some other implementations, the non-AP MLD 1120 may be one example of the non-AP MLD 620 of FIG. 6, and accordingly, the STAs 1122, 1124, and 1126 may be examples of the STAs 622, 624, and 626, respectively. In still further implementations, the non-AP MLD 1120 may be one example of the non-AP MLD 920 or the non-AP MLD 1020 of FIGS. 9 and 10, respectively, and accordingly, the STAs 1122, 1124, and 1126 may be examples of the STAs 922, 924, and 926, or the STAs 1022, 1024, and 1026, respectively.

As described above, each of the STAs 1122, 1124, and 1126 may be able to operate in one of at least two PM modes: active mode or PS mode. In addition to a non-AP MLD requesting a change to a PM mode, an AP MLD may transmit, to a non-AP MLD, an indication of the PM mode that the AP MLD is instructing an STA of the non-AP MLD to follow. Such an indication may be an EOSP bit carried in a QoS Control field of a header of a frame (for example, as shown and described with respect to FIG. 7). Where the AP MLD 1110 is instructing one of the STAs 1122, 1124, and 1126 to operate in an certain PM mode, the AP MLD 1110 may configure a value of an EOSP bit and transmit, to the STA on the link via the AP, a frame having a header with the EOSP bit configured with the value. For example, an EOSP bit having a value configured with "1" may instruct the non-AP MLD 1120 to place the STA operating on the link over which the EOSP bit is received into a PS mode, whereas an EOSP bit having a value configured with "0" may instruct the non-AP MLD 1120 to keep the STA operating on the link over which the EOSP bit is received in an active mode. The non-AP MLD 1120 may receive the frame having the EOSP bit, and the non-AP MLD 1120 may apply the value of the EOSP bit to the STA operating on the link over which the frame was received.

In some aspects, not all non-AP MLDs may support the MLS subfield, and therefore, an AP MLD communicating with a non-AP MLD that fails to support the MLS subfield may disable the MLS subfield. In order for the AP MLD 1110 to know that the non-AP MLD 1120 supports the MLS subfield, the non-AP MLD 1120 may transmit a frame 1140 having information indicating support of the MLS subfield.

The AP MLD 1110 may receive the frame 1140, and based on the information indicating the support of the MLS subfield, the AP MLD 1110 may use one EOSP bit of one frame to configure the PM mode of STAs on multiple links. For example, the AP MLD 1110 may configure an s-type of an S-Type subfield of the MLS subfield with a value (such as "0011" or "3" according to Table 2, above) indicating that the MLS subfield included in the frame 1142 includes MLPS control signaling in which the EOSP bit carried in the QoS Control field is applicable to each of the links indicated in a link ID bitmap carried in an MLS Control Information subfield of the MLS subfield. As illustrated in FIG. 11, for example, the AP MLD 1110 may instruct the non-AP MLD 1120 to apply the EOSP bit in the MAC header of the frame 1142 to the STAs 1122 and 1126 on the links 1102 and 1106 having the IDs 0 and 2, respectively.

The non-AP MLD 1120 may receive the frame 1142 on the link 1106 via the STA 1126. Based on the s-type with which the S-Type subfield of the MLS subfield is configured, the non-AP MLD 1120 may determine that the AP MLD 1110 is instructing the non-AP MLD 1120 to apply the EOSP bit of the frame 1142 to the links associated with bits in the link ID bitmap having a certain value (such as "1"). The non-AP MLD 1120 may determine that the links 1102 and 1106 are associated with bits having the value indicating that the EOSP bit of the frame 1142 is applicable. In response, the non-AP MLD 1120 may place the STAs 1122 and 1126 into the PS mode, and the STAs 1122 and 1126 may doze on the links 1102 and 1106, respectively.

Figure 12:
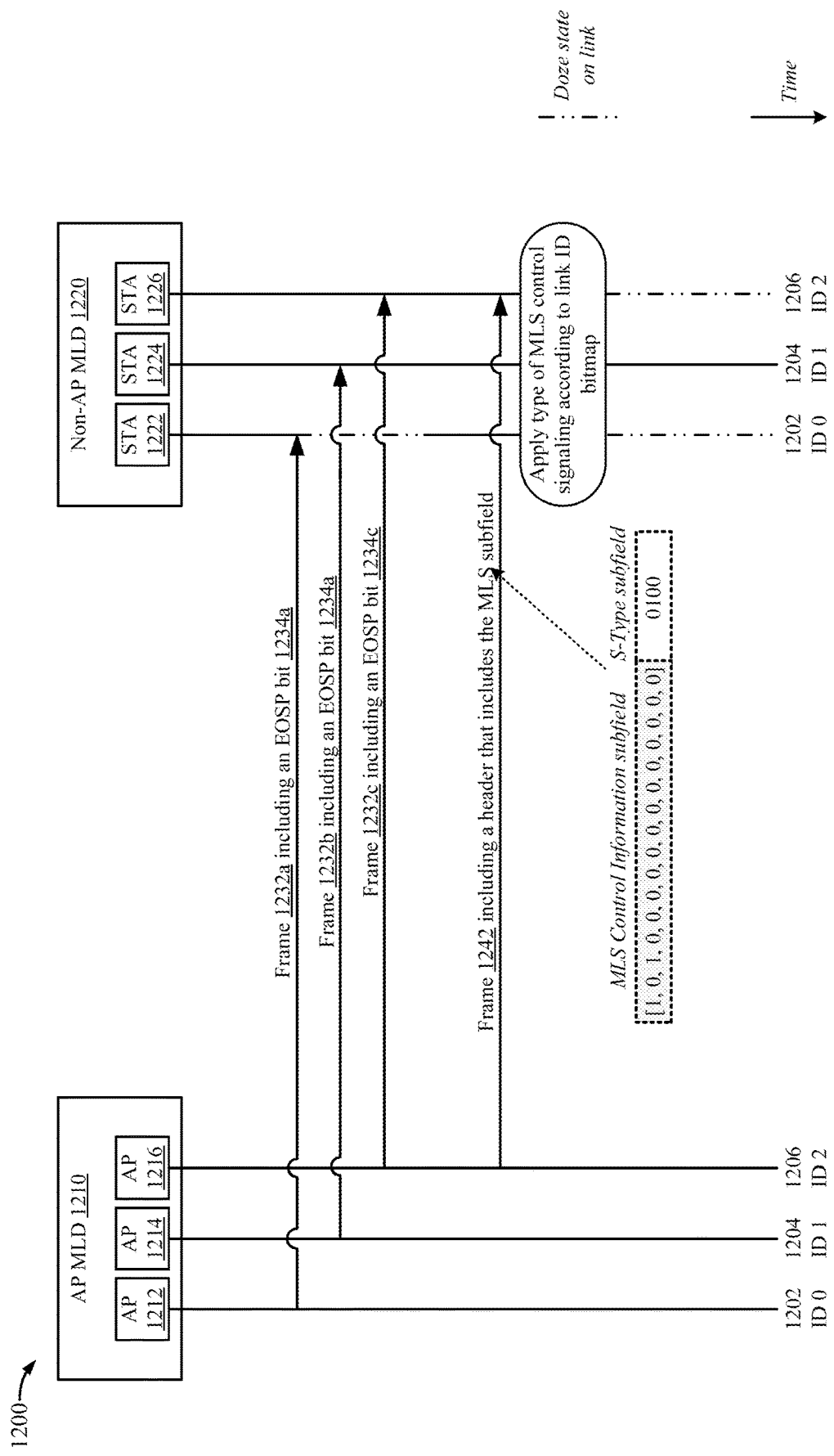
FIG. 12 shows a sequence diagram depicting still another example of wireless communication of cross-link MLS control signaling between an AP MLD and a non-AP MLD in a WLAN, according to some implementations.

FIG. 12 shows a sequence diagram depicting still another example of wireless communication of cross-link MLS control signaling between an AP MLD 1210 and a non-AP MLD 1220 in a WLAN 1200, according to some implementations. In some implementations, the AP MLD 1210 may be one example of the AP 102 of FIG. 1 or the AP 502 of FIG. 5A. In some other implementations, the AP MLD 1210 may be one example of the AP MLD 610 of FIG. 6, and accordingly, the APs 1212, 1214, and 1216 may be examples of the APs 612, 614, and 616, respectively. In still further implementations, the AP MLD 1210 may be one example of the AP MLD the AP MLD 910, the AP MLD 1010, or the AP MLD 1110 of FIGS. 9, 10, and 11, respectively, and accordingly, the APs 1212, 1214, and 1216 may be examples of the APs 912, 914, and 916, the APs 1012, 1014, and 1016, or the APs 1112, 1114, and 1116, respectively.

In some implementations, the non-AP MLD 1220 may be one example of any of the STAs 104 of FIG. 1 or the STA 504 of FIG. 5B. In some other implementations, the non-AP MLD 1220 may be one example of the non-AP MLD 620 of FIG. 6, and accordingly, the STAs 1222, 1224, and 1226 may be examples of the STAs 622, 624, and 626, respectively. In still further implementations, the non-AP MLD 1220 may be one example of the non-AP MLD 920, the non-AP MLD 1020, or the non-AP MLD 1120 of FIGS. 9, 10, and 11, respectively, and accordingly, the STAs 1222, 1224, and 1226 may be examples of the STAs 922, 924, and 926, the STAs 1022, 1024, and 1026, or the STAs 1122, 1124, and 1126, respectively.

Each of the STAs 1222, 1224, and 1226 may operate in a respective PM mode that is independent of the other STAs. For example, the STAs 1222 and 1224 may be operating in an active mode and so may remain awake on the links 1202 and 1204, respectively, whereas the STA 1226 may be operating in a PS mode and so may doze on the link 1206. In some aspects, the non-AP MLD 1120 may transmit a frame 1240 having information indicating support of the MLS subfield.

The AP MLD 1210 may receive the frame 1240, and based on the information indicating the support of the MLS subfield, the AP MLD 1210 may use one EOSP bit of one frame to configure the PM mode of STAs on multiple links. For example, the AP MLD 1210 may configure an s-type of an S-Type subfield of the MLS subfield with a value (such as "0100" or "4" according to Table 2, above) indicating that the MLS subfield included in the frame 1242 includes MLPS control signaling in which an EOSP bit carried in a QoS Control header field of a respective frame is applicable to each of the links indicated in a link ID bitmap carried in an MLS Control Information subfield of the MLS subfield.

In the illustrated example, the AP 1212 may transmit, to the STA 1222 on the link 1202, a frame 1232a that includes an EOSP bit 1234*a*, which may be set to "1" to instruct the non-AP MLD 1220 to place the STA 1222 operating on the link 1202 into a PS mode. The non-AP MLD 1220 may receive the frame 1232*a*, and based thereon, may place the STA 1222 into a PS mode in which the STA 1222 may doze on the link 1202.

Further, the AP 1214 may transmit, to the STA 1224 on the link 1204, a frame 1232*b* that includes an EOSP bit 1234*b*, which may be set to "0" to instruct the non-AP MLD 1220 to keep the STA 1224 operating on the link 1204 in an active mode. The non-AP MLD 1220 may receive the frame 1232*b*, and based thereon, may maintain the STA 1224 into the active mode in which the STA 1224 may remain awake on the link 1204.

Still further, the AP 1216 may transmit, to the STA 1226 on the link 1206, a frame 1232*c* that includes an EOSP bit 1234*c*, which may be set to "0" to instruct the non-AP MLD 1220 to keep the STA 1226 operating on the link 1206 in an active mode. The non-AP MLD 1220 may receive the frame 1232*c*, and based thereon, may maintain the STA 1226 in the active mode in which the STA 1226 may remain awake on the link 1206.

The AP MLD 1210 may be configured to request, via the MLS subfield, a change in PM modes on multiple links at an individual link level of granularity. In contrast to the aspects and examples described with respect to FIG. 11, above, in which the AP MLD 1120 configures PM modes on multiple links at a multi-link level (that is, one value of one EOSP bit is applied to all of the multiple links). For example, the AP MLD 1210 may generate a frame 1242 including a header that includes an MLS subfield (for example, as illustrated and described with respect to FIG. 8). The AP MLD 1210 may transmit the frame 1242 to the non-AP MLD 1220 via one of the APs 1212, 1214, and 1216 on one of the respective links 1202, 1204, and 1206.

The AP MLD 1210 may configure an s-type of the S-Type subfield of the MLS subfield with a value indicating that the MLS control signaling includes MLPS control information, from the AP MLD 1210 to the non-AP MLD 1220, that instructs, for each of the links corresponding to a bit position in the link ID bitmap having a bit configured with a certain value (such as "1"), the EOSP bit of a respective frame received on the link be applied for the STA operating on the link. For example, the respective frame may be a frame (having an EOSP bit configured with a value) that is most recently transmitted by the AP on the link.

Illustratively, the AP MLD 1210 may configure an s-type of the S-Type subfield with a value of "0100" (or "4"), which according to Table 2, above, corresponds to MLPS control information indicating an instruction from an AP MLD to a non-AP MLD to apply, on each of the links corresponding to a bit position of a link ID bitmap having a bit configured with a certain value, an EOSP bit from a respective frame that is most recently received on the link. The STA 1222 may be operating in a PS mode and dozing on the link 1202 pursuant to the EOSP bit 1234*a* of the frame 1232*a*, but the STA 1222 may have been subsequently transitioned back into the active mode at a later time (for example, based on receiving, from the AP 1212 on the link 1202, a beacon frame indicating that the AP 1212 has data to send to the STA 1222). The AP MLD 1210 may instruct the STA 1222 to return to the PS mode via reference to the frame 1232*a*, which may be the most recently transmitted frame having the EOSP bit 1234*a* configured with a value. Accordingly, the AP MLD 1210 may configure the s-type of the S-Type subfield with the value "0100" and may configure a bit at a bit position (such as bit position B0 corresponding to ID 0 of the link 1202) in the link ID bitmap that corresponds to the link 1202 with a value (such as "1") indicating that the MLPS control information of the s-type is applicable thereto.

Conversely, the AP MLD 1210 may refrain from instructing a change to the PM mode of the STA 1224. Therefore, the AP MLD 1210 may configure a bit at a bit position (such as bit position B1 corresponding to ID 1 of the link 1204) in the link ID bitmap that corresponds to the link 1204 with a value (such as "0") indicating that the MLPS control information of the s-type is inapplicable thereto.

The STA 1226 may be operating in an active mode and awake on the link 1202 pursuant to the EOSP bit 1234*c* of the frame 1232*c*. Where the AP MLD 1210 would instruct the STA 1226 to remain in the active mode, the AP MLD 1210 may indicate such an instruction via reference to the frame 1232*c*, which may be the most recently transmitted frame having the EOSP bit 1234*c* configured with a value. Accordingly, the AP MLD 1210 may configure a bit at a bit position (such as bit position B2 corresponding to ID 2 of the link 1206) in the link ID bitmap that corresponds to the link 1206 with a value (such as "1") indicating that the MLPS control information of the s-type is applicable thereto.

The non-AP MLD 1220 may receive the frame 1242 having the header that includes the MLS subfield, and based on the information with which the MLS subfield is configured, may identify the s-type of MLS control signaling. For example, the non-AP MLD 1220 may access information indicating at least a portion of Table 2, stored in memory of the AP MLD 1220, to find the s-type of MLS control signaling that is mapped to the value of "0100." The non-AP MLD 1220 may determine that the s-type corresponds to the MLPS control information indicating an instruction from an AP MLD to a non-AP MLD to apply, on each of the links corresponding to a bit position in the link ID bitmap having a bit configured with a certain value, an EOSP bit from a respective frame that is most recently received on the link.

The non-AP MLD 1220 may therefore apply the EOSP bits 1234*a* and 1234*c* on the links 1202 and 1206, respectively. For example, the non-AP MLD 1220 may identify the links 1202 and 1206 as having the MLPS control information being applicable thereto based on the link ID bitmap bit positions that correspond to the links 1202 and 1206 having bits configured with the value of "1." The non-AP MLD 1220 may further determine the values of the EOSP bits 1234*a* and 1234*c* included in the frames 1232*a* and 1232*c* most recently received on the links 1202 and 1206, respectively. The AP MLD 1210 may update the PM mode of the STA 1222 on the link 1202 to the PS mode based on the EOSP bit 1234*a* of the frame 1232*a* being configured with a value of "1," and may update the PM mode of the STA 1226 on the link 1206 to the active mode based on the EOSP bit 1234*c* of the frame 1232*c* being configured with a value of "0." For example, the non-AP MLD 1220 may signal the STA 1222 to transition to the PS mode, in which the STA 1222 may doze on the link 1202, but may signal the STA 1226 to transition to the active mode, in which the STA 1226 remains awake on the link 1206.

Figure 13:
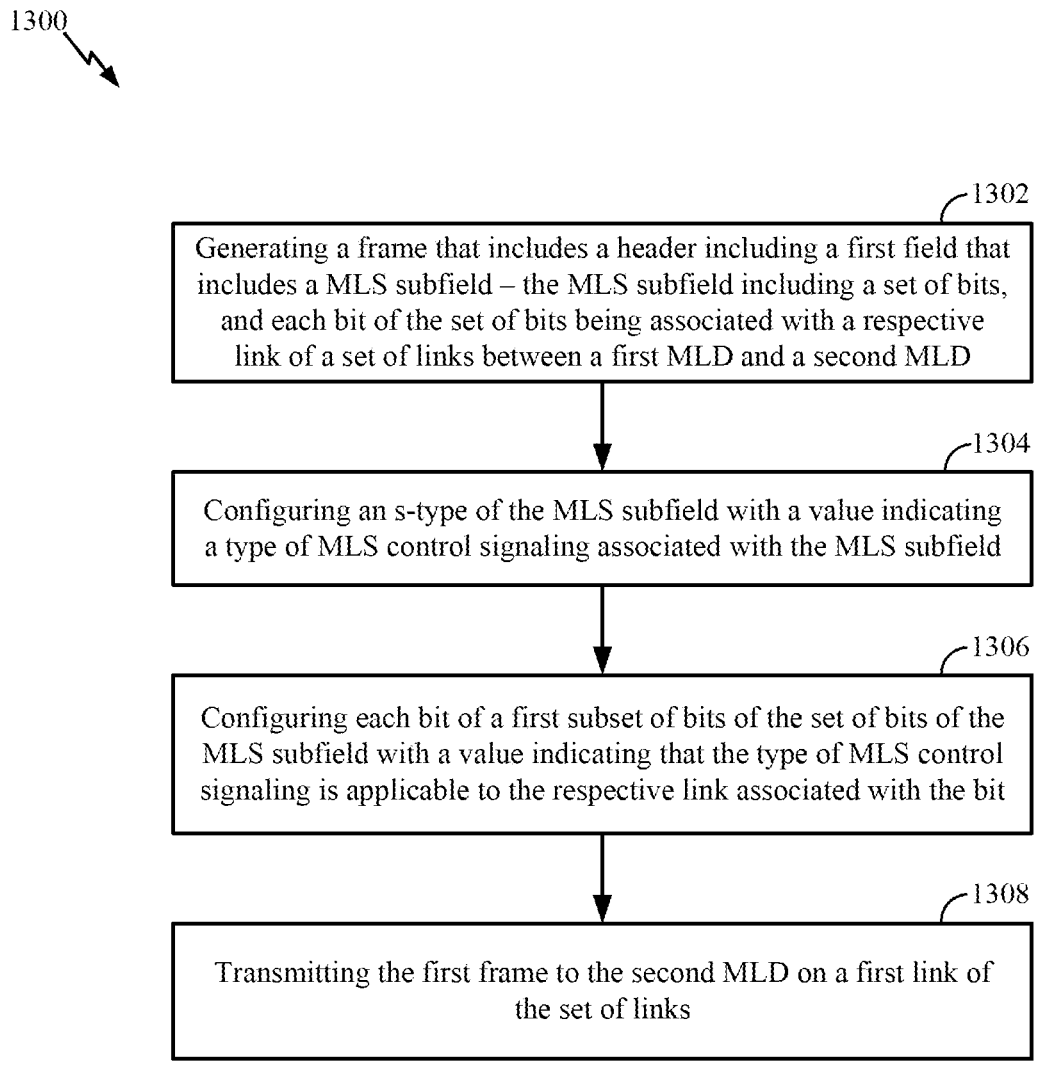
FIG. 13 shows a flowchart illustrating an example process for cross-link wireless communication of MLS control signaling in a WLAN, according to some implementations.

FIG. 13 shows a flowchart illustrating an example process 1300 for cross-link wireless communication of MLS control signaling in a WLAN, according to some implementations. In some implementations, the process 1300 may be performed by an AP, such as one of the AP 102 of FIG. 1 or the AP 502 of FIG. 5A. In some other implementations, the process 1300 may be performed by an STA, such as one of the STAs 104 of FIG. 1 or the STA 504 of FIG. 5B. In still other implementations, the process 1300 may be performed by or at an MLD, such as one of the AP MLD 610 or the non-AP MLD 620 of FIG. 6, or one of the AP MLD 910, 1010, 1110, or 1210 or the non-AP MLD 920, 1020, 1120, or 1220 of FIG. 9, 10, 11, or 12, respectively.

In some implementations, the process 1300 begins in block 1302 with generating a frame that includes a header including a first field that includes a MLS subfield, the MLS subfield including a set of bits, each bit of the set of bits being associated with a respective link of a set of links between the first MLD and a second MLD. In some aspects, the first field further includes a control subfield, and the process 1300 may include an operation for configuring a control ID of the control subfield with a value indicating that the control subfield includes the MLS subfield. In some aspects, the value with which the control ID is configured is associated with an AAR subfield.

The process 1300 may include block 1304 that includes configuring an s-type of the MLS subfield with a value indicating a type of MLS control signaling associated with the MLS subfield.

The process 1300 may include block 1306 that includes configuring each bit of a first subset of bits of the set of bits of the MLS subfield with a value indicating that the type of MLS control signaling is applicable to the respective link associated with the bit. In some aspects, the MLS subfield includes a link ID bitmap that includes the set of bits, and each bit is configured at a respective bit position of a set of bit positions, and each of the set of bit positions in the link ID bitmap indicates a respective association between a bit of the set of bits at the bit position and the respective link.

The process 1300 may include block 1308 that includes transmitting the first frame to the second MLD on a first link of the set of links.

In some aspects, the process 1300 may further include a block for configuring each bit of a second subset of bits of the set of bits of the MLS subfield with a value indicating that the type of MLS control signaling is inapplicable to the respective link associated with the bit.

In some aspects, the header of the first frame further includes a second field having a power management bit configured with a value that is associated with one of a power save mode or an active mode, and the value of the s-type indicates that the power management bit is applicable to the links associated with the first subset of bits.

In some aspects, a header of the first frame further includes a second field having an end-of-service-period bit configured with a value that is associated with one of a power save mode or an active mode, and the value of the s-type indicates that the end-of-service-period bit is applicable to the links associated with the first subset of bits.

In some aspects, the process 1300 may further include a block for generating a set of second frames that each includes a respective header having one of a power management bit or an end-of-service-period bit; configuring, in the respective header of each second frame, the one of the power management bit or the end-of-service-period bit with a respective value that is associated with one of a power save mode or an active mode; and transmitting each second frame of the set of second frames to the second MLD on a respective link of the set of links. In some such aspects, the value of the s-type indicates that the one of the power management bit or the end-of-service-period bit included in the respective header is applicable to the respective link on which each second frame is transmitted.

In some aspects, each of the set of second frames most recently indicates the one of the power management bit or the end-of-service-period bit for the respective link on which the second frame is transmitted.

In some aspects, the value of the s-type further indicates that the links associated with the first subset of bits are recommended for communication between the first MLD and the second MLD.

In some aspects, the value of the s-type further indicates that the links associated with the first subset of bits are one of enabled or disabled.

In some aspects, the value of the s-type further indicates a change on the links associated with the first subset of bits to at least one of: a data rate of communication, a redundancy scheme used for communication, an immediacy expectation of multi-link control responses, or a multi-link mode.

In some aspects, the value of the s-type further indicates a request to perform a RTS/clear to send CTS procedure for a frame exchange on each link of the links associated with the first subset of bits.

In some aspects, the process 1300 may further include a block for receiving a second frame from the second MLD. The second frame may include an acknowledgement associated with the first frame; and configuring a power management state associated with each link of the links associated with the first subset of bits in response to the acknowledgement.

Figure 14:
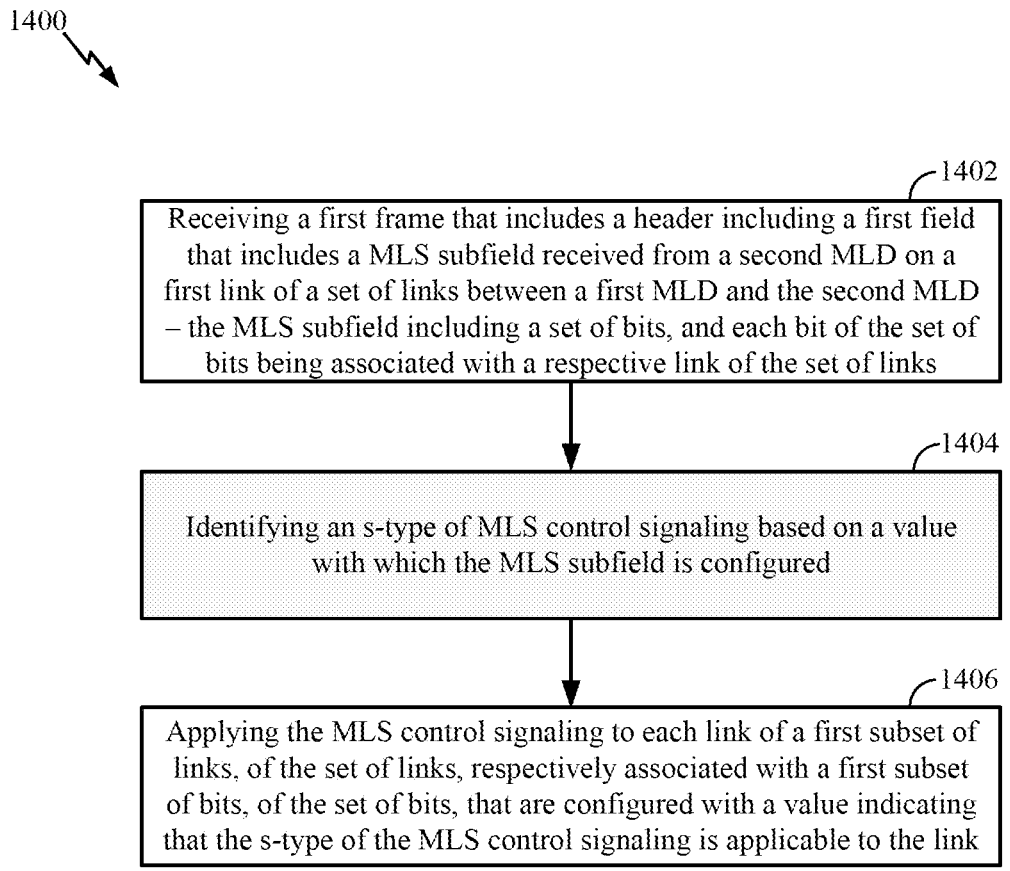
FIG. 14 shows a flowchart illustrating another example process for cross-link wireless communication of MLS control signaling in a WLAN, according to some implementations.

FIG. 14 shows a flowchart illustrating another example process 1400 for cross-link wireless communication of MLS control signaling in a WLAN, according to some implementations. In some implementations, the process 1400 may be performed by an AP, such as one of the AP 102 of FIG. 1 or the AP 502 of FIG. 5A. In some other implementations, the process 1400 may be performed by an STA, such as one of the STAs 104 of FIG. 1 or the STA 504 of FIG. 5B. In still other implementations, the process 1400 may be performed by or at an MLD, such as one of the AP MLD 610 or the non-AP MLD 620 of FIG. 6, or one of the AP MLD 910, 1010, 1110, or 1210 or the non-AP MLD 920, 1020, 1120, or 1220 of FIG. 9, 10, 11, or 12, respectively.

In some aspects, the process 1400 begins in block 1402 with receiving a first frame that includes a header including a first field that includes an MLS subfield received from a second MLD on a first link of a set of links between the first MLD and the second MLD. The MLS subfield may include a set of bits, and each bit of the set of bits may be associated with a respective link of the set of links.

The process 1400 may proceed at block 1404 with identifying an s-type of MLS control signaling based on a value with which the MLS subfield is configured.

The process 1400 may proceed at block 1406 with applying the MLS control signaling to each link of a first subset of links, of the set of links, respectively associated with a first subset of bits, of the set of bits, that are configured with a value indicating that the s-type of the MLS control signaling is applicable to the link. In some aspects, block 1406 may include configuring a respective mode of each link of the first subset of links based on the MLS control signaling. In some aspects, block 1406 may include entering one of a doze state or an awake state on each of the links associated with the first subset of bits, and wherein the MLS control signaling comprises a value with which an end-of-service-period bit in a QoS Control field is configured.

In some aspects, the process 1400 may further include a block for interpreting control information with which a control information subfield of a control subfield of the first field is configured as MLS control information with which the MLS subfield is configured based on a control ID of the control subfield.

In some aspects, the value with which the control ID is configured is associated with an AAR subfield.

In some aspects, the process 1400 may further include a block for transmitting a second frame to the second MLD. The second frame may include an acknowledgement associated with the first frame, and the s-type of the MLS control signaling is associated with a power management mode of the second MLD.

In some aspects, the MLS subfield includes a link ID bitmap that includes the set of bits, and each bit is configured at a respective bit position of a set of bit positions, and each of the set of bit positions in the link ID bitmap indicates a respective association between a bit of the set of bits at the bit position and the respective link.

In some aspects, the process 1400 may further include a block for refraining from applying the MLS control signaling to each link of a second subset of links, of the set of links, that is associated with a second subset of bits, of the set of bits, at a second subset of bit positions, of the set of bit positions, that is different than a first subset of bit positions, of the set bit positions, at which the first subset of bits are configured, and the second subset of bits is configured with a value indicating that the MLS control signaling is inapplicable to the second subset of links.

In some aspects, the header of the first frame further includes a second field having a power management bit or an end-of-service-period bit configured with a value that is associated with one of a power save mode or an active mode, and the value of the s-type indicates that the value of the one of the power management bit or the end-of-service-period bit is applicable to the respective link associated with each bit of the first subset of bits.

In some aspects, the process 1400 may further include a block for receiving a set of second frames that are respectively received on the first subset of links, and each second frame of the set of second frames includes one of a power management bit or an end-of-service-period bit configured with a respective value, and the value of the s-type indicates that the respective value of the one of the power management bit or the end-of-service-period bit is applicable to the link of the first subset of links over which the second frame is received. In some aspects, each of the set of second frames most recently indicates the one of the power management bit or the end-of-service-period bit for the respective link on which the second frame is received.

In some aspects, the value of the s-type further indicates that the links associated with the first subset of bits are recommended for communication between the first MLD and the second MLD.

In some aspects, the value of the s-type further indicates that the links associated with the first subset of bits are one of enabled or disabled.

In some aspects, the value of the s-type further indicates a change on the links associated with the first subset of bits to at least one of: a data rate of communication, a redundancy scheme used for communication, an immediacy expectation of multi-link control responses, or a multi-link mode.

In some aspects, the value of the s-type further indicates a request to perform an RTS/CTS procedure for a frame exchange on each link of the links associated with the first subset of bits.

Figure 15:
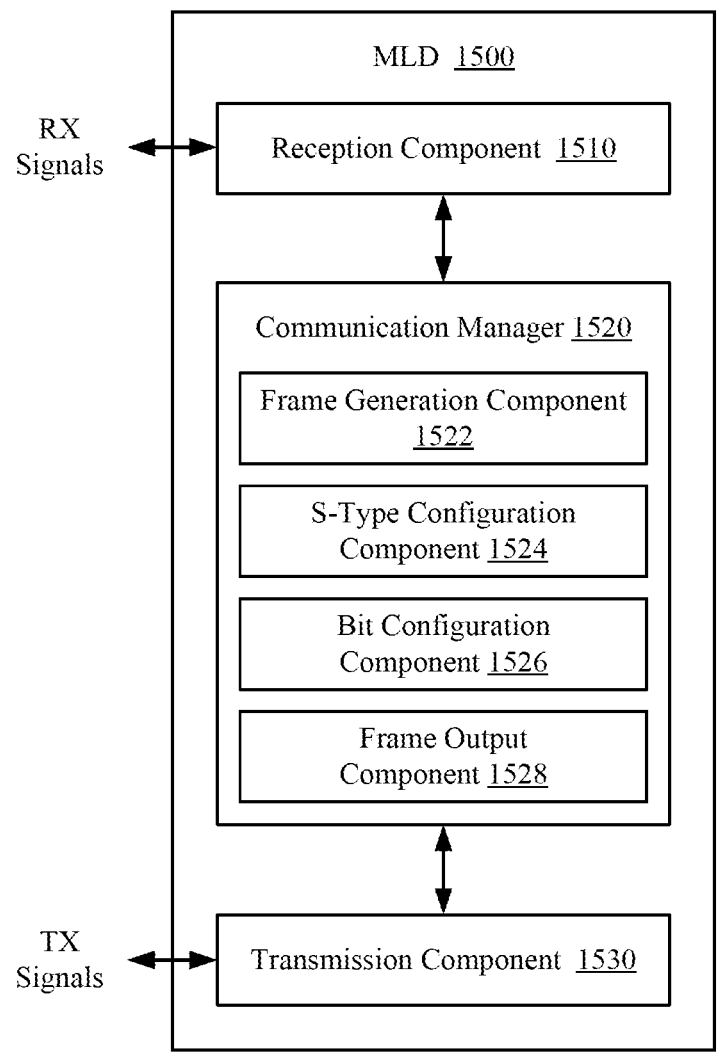
FIG. 15 shows a block diagram of an example MLD, according to some implementations.

FIG. 15 shows a block diagram of an example MLD 1500, according to some implementations. In some implementations, the MLD 1500 is configured to perform the process 1300 described above with reference to FIG. 13. In some implementations, the MLD 1500 may be a chip, SoC, chipset, package, circuitry, device, or system that includes at least one processor and at least one modem, such as a Wi-Fi or IEEE 802.11-compliant modem or a cellular modem.

In some aspects, the MLD 1500 can be an example implementation of an AP or an AP MLD, such as the AP 102 described above with reference to FIG. 1, the AP 502 or WCD 510 described above with reference to FIG. 5A, the AP MLD 610 described above with reference to FIG. 6, or one of the AP MLD 910, 1010, 1110, or 1210 described above with reference to FIGS. 9, 10, 11, and 12, respectively. In some other aspects, the MLD 1500 can be an example implementation of an STA or a non-AP MLD, such as one of the STAs 104 described above with reference to FIG. 1, the STA 504 or WCD 515 described above with reference to FIG. 5B, the non-AP MLD 620 described above with reference to FIG. 6, or one of the non-AP MLD 920, 1020, 1120, or 1220 described above with reference to FIGS. 9, 10, 11, and 12, respectively.

The MLD 1500 includes a reception component 1510, a communication manager 1520, and a transmission component 1530. The communication manager 1520 further includes a frame generation component 1522, an S-Type configuration component 1524, a bitmap configuration component 1526, and a frame output component 1528. In some aspects, portions of one or more of the components 1522, 1524, 1526, and 1528 may be implemented at least in part in hardware or firmware. In some implementations, at least one of the components 1522, 1524, 1526, or 1528 is implemented at least in part as software stored in a memory, such as the memory 408 of FIG. 4, the memory 540 of FIG. 5A, or the memory 545 of FIG. 5B. For example, portions of one or more of the components 1522, 1524, 1526, and 1528 may be implemented as instructions or computer-executable code (which may be stored on a non-transitory, computer-readable medium) executable by a processor (such as the processor 406 of FIG. 4, the application processor 530 of FIG. 5A, or the application processor 535 of FIG. 5B) to perform the functions or operations of the respective one of the component 1522, 1524, 1526, or 1528.

The reception component 1510 is configured to receive RX signals, over a wireless channel, from at least one of an AP, an STA, or an MLD (such as a non-AP MLD or an AP MLD). The transmission component 1530 is configured to transmit TX signals, over a wireless channel, to at least one of an AP, an STA, or an MLD (such as a non-AP MLD or an AP MLD). The communication manager 1520 is configured to control or manage communications with at least one of an AP, STA, or an MLD (such as a non-AP MLD or an AP MLD).

In some implementations, the frame generation component 1522 may generate a frame that includes a header including a first field that includes a MLS subfield. The MLS subfield may include a set of bits, and each bit of the set of bits may be associated with a respective link of a set of links between the first MLD and a second MLD. The S-Type configuration component 1524 may configure an s-type of the MLS subfield with a value indicating a type of MLS control signaling associated with the MLS subfield. The bitmap configuration component 1526 may configure each bit of a first subset of bits of the set of bits of the MLS subfield with a value indicating that the type of MLS control signaling is applicable to the respective link associated with the bit. The frame output component 1528 may output the first frame for transmission to the second MLD on a first link of the set of links. In some aspects, the frame output component 1528 may include an interface, such as an interface of a processor, a protocol interface, or another interface enabling a frame having a header to be output for wireless transmission, such as by packetizing, encoding, or modulating the frame with the header for wireless transmission via an antenna(s) of the MLD 1500.

In some aspects, the bitmap configuration component 1526 may further configure each bit of a second subset of bits of the set of bits of the MLS subfield with a value indicating that the type of MLS control signaling is inapplicable to the respective link associated with the bit.

In some aspects, the frame generation component 1522 may be further configured to generate a set of second frames that each includes a respective header having one of a power management bit or an end-of-service-period bit. The communication manager 1520 may further include a header configuration component that may configure, in the respective header of each second frame, the one of the power management bit or the end-of-service-period bit with a respective value that is associated with one of a power save mode or an active mode. The frame output component 1528 may be further configured to output each second frame of the set of second frames for transmission to the second MLD on a respective link of the set of links, and the value of the s-type indicates that the one of the power management bit or the end-of-service-period bit included in the respective header is applicable to the respective link on which each second frame is transmitted.

In some aspects, the communication manager 1520 may further include a frame obtainment component that may obtain a second frame from the second MLD, and the second frame may include an acknowledgement associated with the first frame. In some aspects, the communication manager 1520 may further include a power state configuration component that may configure a power management state associated with each link of the links associated with the first subset of bits in response to the acknowledgement.

Figure 16:
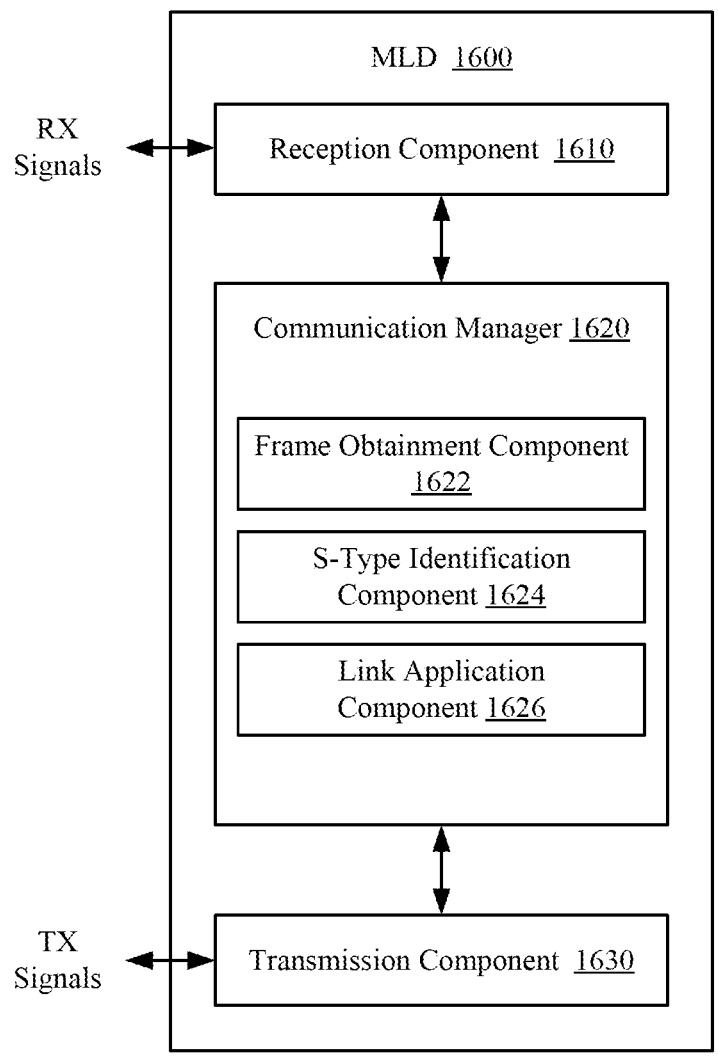
FIG. 16 shows a block diagram of another example MLD, according to some implementations.

FIG. 16 shows a block diagram of an example MLD 1600, according to some implementations. In some implementations, the MLD 1600 is configured to perform the process 1400 described above with reference to FIG. 14. In some implementations, the MLD 1600 may be a chip, SoC, chipset, package, circuitry, device, or system that includes at least one processor and at least one modem, such as a Wi-Fi or IEEE 802.11-compliant modem or a cellular modem.

In some aspects, the MLD 1600 can be an example implementation of an AP or an AP MLD, such as the AP 102 described above with reference to FIG. 1, the AP 502 or WCD 510 described above with reference to FIG. 5A, the AP MLD 610 described above with reference to FIG. 6, or one of the AP MLD 910, 1010, 1110, or 1210 described above with reference to FIGS. 9, 10, 11, and 12, respectively. In some other aspects, the MLD 1600 can be an example implementation of an STA or a non-AP MLD, such as one of the STAs 104 described above with reference to FIG. 1, the STA 504 or WCD 515 described above with reference to FIG. 5B, the non-AP MLD 620 described above with reference to FIG. 6, or one of the non-AP MLD 920, 1020, 1120, or 1220 described above with reference to FIGS. 9, 10, 11, and 12, respectively.

The MLD 1600 includes a reception component 1610, a communication manager 1620, and a transmission component 1630. The communication manager 1620 further includes a frame obtainment component 1622, an S-Type identification component 1624, and a link application component 1626. In some aspects, portions of one or more of the components 1622, 1624, and 1626 may be implemented at least in part in hardware or firmware. In some implementations, at least one of the components 1622, 1624, or 1626 is implemented at least in part as software stored in a memory, such as the memory 408 of FIG. 4, the memory 540 of FIG. 5A, or the memory 545 of FIG. 5B. For example, portions of one or more of the components 1622, 1624, and 1626 may be implemented as instructions or computer-executable code (which may be stored on a non-transitory, computer-readable medium) executable by a processor (such as the processor 406 of FIG. 4, the application processor 530 of FIG. 5A, or the application processor 535 of FIG. 5B) to perform the functions or operations of the respective one of the component 1622, 1624, or 1626.

The reception component 1610 is configured to receive RX signals, over a wireless channel, from at least one of an AP, an STA, or an MLD (such as a non-AP MLD or an AP MLD). The transmission component 1630 is configured to transmit TX signals, over a wireless channel, to at least one of an AP, an STA, or an MLD (such as a non-AP MLD or an AP MLD). The communication manager 1620 is configured to control or manage communications with at least one of an AP, an STA, or an MLD (such as a non-AP MLD or an AP MLD).

In some implementations, the frame obtainment component 1622 may obtain a first frame that includes a header including a first field that includes a MLS subfield received from a second MLD on a first link of a set of links between the first MLD and the second MLD. The MLS subfield may include a set of bits, and each bit of the set of bits may be associated with a respective link of the set of links. In some aspects, the frame obtainment component 1622 may include an interface, such as an interface of a processor, a protocol interface, or another interface enabling a frame with a header that is wirelessly received at an antenna(s) of the MLD 1600 to be processed, such as by decoding, parsing, or extracting the information carried in the header of the frame. The S-Type identification component 1624 may identify an s-type of MLS control signaling based on a value with which the MLS subfield is configured. The link application component 1626 may apply the MLS control signaling to each link of a first subset of links, of the set of links, respectively associated with a first subset of bits, of the set of bits, that are configured with a value indicating that the s-type of the MLS control signaling is applicable to the link.

In some aspects, the communication manager 1620 may further include an interpretation component that may interpret control information with which a control information subfield of a control subfield of the first field is configured as MLS control information with which the MLS subfield is configured based on a control ID of the control subfield.

In some aspects, the link application component 1626 may be further configured to configure a respective mode of each link of the first subset of links based on the MLS control signaling. In some aspects, the link application component 1626 may be further configured to enter one of a doze state or an awake state on each of the links associated with the first subset of bits, and wherein the MLS control signaling comprises a value with which an end-of-service-period bit in a QoS control field is configured.

In some aspects, the communication manager 1620 may further include a frame output component that may output a second frame for transmission to the second MLD, and the second frame may include an acknowledgement associated with the first frame, and the s-type of the MLS control signaling is associated with a power management mode of the second MLD.

In some aspects, the communication manager 1620 further includes an application refrainment component that may refrain from applying the MLS control signaling to each link of a second subset of links, of the set of links, that is associated with a second subset of bits, of the set of bits, at a second subset of bit positions, of the set of bit positions, that is different than a first subset of bit positions, of the set bit positions, at which the first subset of bits are configured, and the second subset of bits is configured with a value indicating that the MLS control signaling is inapplicable to the second subset of links.

In some aspects, the frame obtainment component 1622 may be further configured to obtain a set of second frames that are respectively received on the first subset of links. Each second frame of the set of second frames may include one of a power management bit or an end-of-service-period bit configured with a respective value, and the value of the s-type indicates that the respective value of the one of the power management bit or the end-of-service-period bit is applicable to the link of the first subset of links over which the second frame is received.

Implementation examples are described in the following numbered clauses:

A method of wireless communication at a first multi-link device (MLD), comprising:
- generating a frame that includes a header including a first field that includes a multi-link signaling (MLS) subfield, the MLS subfield including a set of bits, each bit of the set of bits being associated with a respective link of a set of links between the first MLD and a second MLD;
- configuring a signaling type (s-type) of the MLS subfield with a value indicating a type of MLS control signaling associated with the MLS subfield;
- configuring each bit of a first subset of bits of the set of bits of the MLS subfield with a value indicating that the type of MLS control signaling is applicable to the respective link associated with the bit; and
- transmitting the first frame to the second MLD on a first link of the set of links.

2. The method of clause 1, wherein the first field further includes a control subfield, and wherein the processing system is further configured to configure a control ID of the control subfield with a value indicating that the control subfield includes the MLS subfield.

3. The method of clause 1 or 2, wherein the value with which the control ID is configured is associated with an access point (AP) assistance requested (AAR) subfield.

4. The method of any of clauses 1 to 3, wherein the MLS subfield comprises a link ID bitmap that includes the set of bits, wherein each bit is configured at a respective bit position of a set of bit positions, and wherein each of the set of bit positions in the link ID bitmap indicates a respective association between a bit of the set of bits at the bit position and the respective link.

5. The method of any of clauses 1 to 4, further comprising:
- configuring each bit of a second subset of bits of the set of bits of the MLS subfield with a value indicating that the type of MLS control signaling is inapplicable to the respective link associated with the bit.

6. The method of any of clauses 1 to 5, wherein the header of the first frame further includes a second field having a power management bit configured with a value that is associated with one of a power save mode or an active mode, and wherein the value of the s-type indicates that the power management bit is applicable to the links associated with the first subset of bits.

7. The method of any of clauses 1 to 5, wherein the header of the first frame further includes a second field having an end-of-service-period bit configured with a value that is associated with one of a power save mode or an active mode, and wherein the value of the s-type indicates that the end-of-service-period bit is applicable to the links associated with the first subset of bits.

8. The method of any of clauses 1 to 5, further comprising:
- generating a set of second frames that each includes a respective header having one of a power management bit or an end-of-service-period bit;
- configuring, in the respective header of each second frame, the one of the power management bit or the end-of-service-period bit with a respective value that is associated with one of a power save mode or an active mode; and
- transmitting each second frame of the set of second frames to the second MLD on a respective link of the set of links, wherein the value of the s-type indicates that the one of the power management bit or the end-of-service-period bit included in the respective header is applicable to the respective link on which each second frame is transmitted.

9. The method of clause 8, wherein each of the set of second frames most recently indicates the one of the power management bit or the end-of-service-period bit for the respective link on which the second frame is transmitted.

10. The method of any of clauses 1 to 5, wherein the value of the s-type further indicates that the links associated with the first subset of bits are recommended for communication between the first MLD and the second MLD.

11. The method of any of clauses 1 to 5, wherein the value of the s-type further indicates that the links associated with the first subset of bits are one of enabled or disabled.

12. The method of any of clauses 1 to 5, wherein the value of the s-type further indicates a change on the links associated with the first subset of bits to at least one of:
- a data rate of communication,
- a redundancy scheme used for communication,
- an immediacy expectation of multi-link control responses, or
- a multi-link mode.

13. The method of any of clauses 1 to 5, wherein the value of the s-type further indicates a request to perform a request to send (RTS)/clear to send (CTS) procedure for a frame exchange on each link of the links associated with the first subset of bits.

14. The method of any of clauses 1 to 5, further comprising:
- receiving a second frame from the second MLD, the second frame comprising an acknowledgement associated with the first frame; and c
- configuring a power management state associated with each link of the links associated with the first subset of bits in response to the acknowledgement.

15. A method of wireless communication at a first multi-link device, comprising:
- receiving a first frame that includes a header including a first field that includes a multi-link signaling (MLS) subfield from a second MLD on a first link of a set of links between the first MLD and the second MLD, the MLS subfield including a set of bits, each bit of the set of bits being associated with a respective link of the set of links;
identifying a signaling type (s-type) of MLS control signaling based on a value with which the MLS subfield is configured; and
applying the MLS control signaling to each link of a first subset of links, of the set of links, respectively associated with a first subset of bits, of the set of bits, that are configured with a value indicating that the s-type of the MLS control signaling is applicable to the link.

16. The method of clause 15, further comprising:
interpreting control information with which a control information subfield of a control subfield of the first field is configured as MLS control information with which the MLS subfield is configured based on a control identifier (ID) of the control subfield.

17. The method of clause 15 or 16, wherein the value with which the control ID is configured is associated with an access point (AP) assistance requested (AAR) subfield.

18. The method of any of clauses 15 to 17, wherein applying the MLS control signaling to each link of the first subset of links comprises configuring a respective mode of each link of the first subset of links based on the MLS control signaling.

19. The method of clause 18, further comprising:
transmitting a second frame to the second MLD, the second frame comprising an acknowledgement associated with the first frame,
wherein the s-type of the MLS control signaling is associated with a power management mode of the second MLD.

20. The method of clause 18, wherein configuring a respective mode of each link of the first subset of links based on the MLS control signaling comprises entering one of a doze state or an awake state on each of the links associated with the first subset of bits, and wherein the MLS control signaling comprises a value with which an end-of-service-period bit in a quality of service (QoS) control field is configured.

21. The method of any of clauses 15 to 20, wherein the MLS subfield comprises a link ID bitmap that includes the set of bits, wherein each bit is configured at a respective bit position of a set of bit positions, and wherein each of the set of bit positions in the link ID bitmap indicates a respective association between a bit of the set of bits at the bit position and the respective link.

22. The method of clause 21, further comprising:
refraining from applying the MLS control signaling to each link of a second subset of links, of the set of links, that is associated with a second subset of bits, of the set of bits, at a second subset of bit positions, of the set of bit positions, that is different than a first subset of bit positions, of the set bit positions, at which the first subset of bits are configured, wherein the second subset of bits is configured with a value indicating that the MLS control signaling is inapplicable to the second subset of links.

23. The method of any of clauses 15 to 22, wherein the header of the first frame further includes a second field having a power management bit or an end-of-service-period bit configured with a value that is associated with one of a power save mode or an active mode, and wherein the value of the s-type indicates that the value of the one of the power management bit or the end-of-service-period bit is applicable to the respective link associated with each bit of the first subset of bits.

24. The method of any of clauses 15 to 22, further comprising:
respectively receiving a set of second frames on the first subset of links, wherein each second frame of the set of second frames includes one of a power management bit or an end-of-service-period bit configured with a respective value, and wherein the value of the s-type indicates that the respective value of the one of the power management bit or the end-of-service-period bit is applicable to the link of the first subset of links over which the second frame is received.

25. The method of clause 24, wherein each of the set of second frames most recently indicates the one of the power management bit or the end-of-service-period bit for the respective link on which the second frame is received.

26. The method of any of clauses 15 to 21, wherein the value of the s-type further indicates that the links associated with the first subset of bits are recommended for communication between the first MLD and the second MLD.

27. The method of clause any of clauses 15 to 21, wherein the value of the s-type further indicates that the links associated with the first subset of bits are one of enabled or disabled.

28. The method of any of clauses 15 to 21, wherein the value of the s-type further indicates a change on the links associated with the first subset of bits to at least one of:
a data rate of communication,
a redundancy scheme used for communication,
an immediacy expectation of multi-link control responses, or
a multi-link mode.

29. The method of any of clauses 15 to 21, wherein the value of the s-type further indicates a request to perform a request to send (RTS)/clear to send (CTS) procedure for a frame exchange on each link of the links associated with the first subset of bits.

30. A first multi-link device, comprising:
at least one memory; and
at least one processor communicatively coupled with the at least one memory, the at least one processor configured to cause the first MLD to:
generate a frame that includes a header including a first field that includes a multi-link signaling (MLS) subfield, the MLS subfield including a set of bits, each bit of the set of bits being associated with a respective link of a set of links between the first MLD and a second MLD;
configure a signaling type (s-type) of the MLS subfield with a value indicating a type of MLS control signaling associated with the MLS subfield;
configure each bit of a first subset of bits of the set of bits of the MLS subfield with a value indicating that the type of MLS control signaling is applicable to the respective link associated with the bit; and
transmit the first frame to the second MLD on a first link of the set of links.

31. A first multi-link device, comprising:
at least one memory; and
at least one processor communicatively coupled with the at least one memory, the at least one processor configured to cause the first MLD to:
receive a first frame that includes a header including a first field that includes a multi-link signaling (MLS) subfield from a second MLD on a first link of a set of links between the first MLD and the second MLD, the MLS subfield including a set of bits, each bit of the set of bits being associated with a respective link of the set of links;

identify a signaling type (s-type) of MLS control signaling based on a value with which the MLS subfield is configured; and apply the MLS control signaling to each link of a first subset of links, of the set of links, respectively associated with a first subset of bits, of the set of bits, that are configured with a value indicating that the s-type of the MLS control signaling is applicable to the link.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus configured for wireless communication at a first multi-link device (MLD), the apparatus comprising:
   a memory;
   a processing system coupled with the memory and configured to cause the first MLD to:
      generate a frame that includes a header including a first field that includes a multi-link signaling (MLS) subfield, the MLS subfield including a set of bits, each bit of the set of bits being associated with a respective link of a set of links between the first MLD and a second MLD;
      configure a signaling type (s-type) of the MLS subfield with a value indicating a type of MLS control signaling associated with the MLS subfield; and
      configure each bit of a first subset of bits of the set of bits of the MLS subfield with a value indicating that the type of MLS control signaling is applicable to the respective link associated with the bit; and
   a first interface configured to output the first frame for transmission to the second MLD on a first link of the set of links.

2. The apparatus of claim 1, wherein the first field further includes a control subfield, and wherein the processing system is further configured to configure a control ID of the control subfield with a value indicating that the control subfield includes the MLS subfield.

3. The apparatus of claim 2, wherein the value with which the control ID is configured is associated with an access point (AP) assistance requested (AAR) subfield.

4. The apparatus of claim 1, wherein the MLS subfield comprises a link ID bitmap that includes the set of bits, wherein each bit is configured at a respective bit position of a set of bit positions, and wherein each of the set of bit positions in the link ID bitmap indicates a respective association between a bit of the set of bits at the bit position and the respective link.

5. The apparatus of claim 4, wherein the processing system is further configured to:
   configure each bit of a second subset of bits of the set of bits of the MLS subfield with a value indicating that the type of MLS control signaling is inapplicable to the respective link associated with the bit.

6. The apparatus of claim 1, wherein the header of the first frame further includes a second field having a power management bit configured with a value that is associated with one of a power save mode or an active mode, and wherein the value of the s-type indicates that the power management bit is applicable to the links associated with the first subset of bits.

7. The apparatus of claim 1, wherein the header of the first frame further includes a second field having an end-of-service-period bit configured with a value that is associated with one of a power save mode or an active mode, and wherein the value of the s-type indicates that the end-of-service-period bit is applicable to the links associated with the first subset of bits.

8. The apparatus of claim 1, wherein the processing system is further configured to:
generate a set of second frames that each includes a respective header having one of a power management bit or an end-of-service-period bit;
configure, in the respective header of each second frame, the one of the power management bit or the end-of-service-period bit with a respective value that is associated with one of a power save mode or an active mode; and wherein
the first interface is further configured to output each second frame of the set of second frames for transmission to the second MLD on a respective link of the set of links, wherein the value of the s-type indicates that the one of the power management bit or the end-of-service-period bit included in the respective header is applicable to the respective link on which each second frame is transmitted.

9. The apparatus of claim 8, wherein each of the set of second frames most recently indicates the one of the power management bit or the end-of-service-period bit for the respective link on which the second frame is transmitted.

10. The apparatus of claim 1, wherein the value of the s-type further indicates that the links associated with the first subset of bits are recommended for communication between the first MLD and the second MLD.

11. The apparatus of claim 1, wherein the value of the s-type further indicates that the links associated with the first subset of bits are one of enabled or disabled.

12. The apparatus of claim 1, wherein the value of the s-type further indicates a change on the links associated with the first subset of bits to at least one of:
a data rate of communication,
a redundancy scheme used for communication,
an immediacy expectation of multi-link control responses, or
a multi-link mode.

13. The apparatus of claim 1, wherein the value of the s-type further indicates a request to perform a request to send (RTS)/clear to send (CTS) procedure for a frame exchange on each link of the links associated with the first subset of bits.

14. The apparatus of claim 1, further comprising:
a second interface configured to obtain a second frame from the second MLD, the second frame comprising an acknowledgement associated with the first frame,
wherein the processing system is further configured to configure a power management state associated with each link of the links associated with the first subset of bits in response to the acknowledgement.

15. An apparatus configured for wireless communication at a first multi-link device (MLD), the apparatus comprising:
a memory;
a first interface configured to obtain a first frame that includes a header including a first field that includes a multi-link signaling (MLS) subfield received from a second MLD on a first link of a set of links between the first MLD and the second MLD, the MLS subfield including a set of bits, each bit of the set of bits being associated with a respective link of the set of links; and
a processing system coupled with the memory and configured to cause the first MLD to:
identify a signaling type (s-type) of MLS control signaling based on a value with which the MLS subfield is configured; and
apply the MLS control signaling to each link of a first subset of links, of the set of links, respectively associated with a first subset of bits, of the set of bits, that are configured with a value indicating that the s-type of the MLS control signaling is applicable to the link.

16. The apparatus of claim 15, wherein the processing system is further configured to:
interpret control information with which a control information subfield of a control subfield of the first field is configured as MLS control information with which the MLS subfield is configured based on a control identifier (ID) of the control subfield.

17. The apparatus of claim 16, wherein the value with which the control ID is configured is associated with an access point (AP) assistance requested (AAR) subfield.

18. The apparatus of claim 15, wherein to apply the MLS control signaling to each link of the first subset of links, the processing system is further configured to configure a respective mode of each link of the first subset of links based on the MLS control signaling.

19. The apparatus of claim 18, further comprising:
a second interface configured to output a second frame for transmission to the second MLD, the second frame comprising an acknowledgement associated with the first frame,
wherein the s-type of the MLS control signaling is associated with a power management mode of the second MLD.

20. The apparatus of claim 18, wherein to configure a respective mode of each link of the first subset of links based on the MLS control signaling, the processing system is further configured to enter one of a doze state or an awake state on each of the links associated with the first subset of bits, and wherein the MLS control signaling comprises a value with which an end-of-service-period bit in a quality of service (QoS) control field is configured.

21. The apparatus of claim 15, wherein the MLS subfield comprises a link ID bitmap that includes the set of bits, wherein each bit is configured at a respective bit position of a set of bit positions, and wherein each of the set of bit positions in the link ID bitmap indicates a respective association between a bit of the set of bits at the bit position and the respective link.

22. The apparatus of claim 21, wherein the processing system is further configured to:
refrain from applying the MLS control signaling to each link of a second subset of links, of the set of links, that is associated with a second subset of bits, of the set of bits, at a second subset of bit positions, of the set of bit positions, that is different than a first subset of bit positions, of the set bit positions, at which the first subset of bits are configured, wherein the second subset of bits is configured with a value indicating that the MLS control signaling is inapplicable to the second subset of links.

23. The apparatus of claim 15, wherein the header of the first frame further includes a second field having a power management bit or an end-of-service-period bit configured with a value that is associated with one of a power save mode or an active mode, and wherein the value of the s-type indicates that the value of the one of the power management bit or the end-of-service-period bit is applicable to the respective link associated with each bit of the first subset of bits.

24. The apparatus of claim 15, wherein the first interface is further configured to obtain a set of second frames that are respectively received on the first subset of links, wherein each second frame of the set of second frames includes one of a power management bit or an end-of-service-period bit configured with a respective value, and wherein the value of the s-type indicates that the respective value of the one of the power management bit or the end-of-service-period bit is applicable to the link of the first subset of links over which the second frame is received.

25. The apparatus of claim 24, wherein each of the set of second frames most recently indicates the one of the power management bit or the end-of-service-period bit for the respective link on which the second frame is received.

26. The apparatus of claim 15, wherein the value of the s-type further indicates that the links associated with the first subset of bits are recommended for communication between the first MLD and the second MLD.

27. The apparatus of claim 15, wherein the value of the s-type further indicates that the links associated with the first subset of bits are one of enabled or disabled.

28. The apparatus of claim 15, wherein the value of the s-type further indicates a change on the links associated with the first subset of bits to at least one of:
- a data rate of communication,
- a redundancy scheme used for communication,
- an immediacy expectation of multi-link control responses, or
- a multi-link mode.

29. The apparatus of claim 15, wherein the value of the s-type further indicates a request to perform a request to send (RTS)/clear to send (CTS) procedure for a frame exchange on each link of the links associated with the first subset of bits.

* * * * *